United States Patent
Peng et al.

(10) Patent No.: US 12,236,957 B1
(45) Date of Patent: Feb. 25, 2025

(54) AUTHENTICATING A USER PROFILE WITH DEVICES

(71) Applicant: Amazon Technologies, Inc., Seattle, WA (US)

(72) Inventors: Lizhen Peng, Seattle, WA (US); Alok Upadhyay, Seattle, WA (US); Jason Cline, Bellevue, WA (US); Ankur Gandhe, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 17/901,269

(22) Filed: Sep. 1, 2022

Related U.S. Application Data

(63) Continuation of application No. 16/712,613, filed on Dec. 12, 2019, now Pat. No. 11,437,043.

(51) Int. Cl.
| | | |
|---|---|---|
| *G10L 17/00* | (2013.01) | |
| *G06N 20/00* | (2019.01) | |
| *G10L 17/02* | (2013.01) | |
| *G10L 17/12* | (2013.01) | |
| *G10L 17/18* | (2013.01) | |
| *G10L 17/24* | (2013.01) | |
| *H04L 67/54* | (2022.01) | |
| *H04W 12/63* | (2021.01) | |

(52) U.S. Cl.
CPC .............. *G10L 17/12* (2013.01); *G06N 20/00* (2019.01); *G10L 17/02* (2013.01); *G10L 17/18* (2013.01); *G10L 17/24* (2013.01); *H04L 67/54* (2022.05)

(58) Field of Classification Search
CPC ... G10L 15/22; G10L 2015/223; G10L 17/00; G10L 17/06; G10L 17/10; G10L 17/22; H04L 63/08; H04L 63/0853; H04L 63/0861; H04L 63/10; H04L 63/0876; H04W 12/06
USPC ............ 704/246, 247, 273; 726/4, 17, 21, 2; 713/168
See application file for complete search history.

(56) References Cited

U.S. PATENT DOCUMENTS

| | | | |
|---|---|---|---|
| 9,350,717 B1 * | 5/2016 | Siddiqui | ............... H04W 12/64 |
| 9,491,033 B1 | 11/2016 | Soyannwo et al. | |
| 9,781,106 B1 * | 10/2017 | Vitus | ................... H04L 63/0861 |
| 9,876,788 B1 | 1/2018 | Ziraknejad et al. | |

(Continued)

OTHER PUBLICATIONS

Office Action for U.S. Appl. No. 16/712,613, mailed Jan. 31, 2022, Peng, "Presence Ground Truth Approximation and Utilization", 17 pages.

(Continued)

*Primary Examiner* — Martin Lerner
(74) *Attorney, Agent, or Firm* — Lee & Hayes, P.C.

(57) ABSTRACT

Systems and methods for presence ground truth approximation and utilization are disclosed. For example, a system detects the presence of a predefined subject, such as a person associated with a given user profile, and/or determines that authentication criteria for performing an action in association with the user profile has been satisfied. A period of time to associate data is determined, and data of one or more data types is labeled as being associated with the speaker identification event. That data may be formatted and input into one or more models to train those models to more accurately detect presence and/or determine whether authentication of a user profile should succeed.

20 Claims, 12 Drawing Sheets

(56) References Cited

U.S. PATENT DOCUMENTS

| | | |
|---|---|---|
| 10,027,662 B1 | 7/2018 | Mutagi et al. |
| 10,051,600 B1 | 8/2018 | Zhong et al. |
| 10,063,542 B1* | 8/2018 | Kao ................ G10L 17/06 |
| 10,498,721 B1* | 12/2019 | Pham ................ H04L 63/08 |
| 10,591,969 B2* | 3/2020 | Agrawal ............ H04W 12/06 |
| 10,902,001 B1 | 1/2021 | Rengasamy et al. |
| 10,909,983 B1 | 2/2021 | Peng et al. |
| 11,328,323 B2* | 5/2022 | Miller ............ G06Q 30/0255 |
| 11,437,043 B1* | 9/2022 | Peng ................ G10L 17/24 |
| 2006/0120281 A1 | 6/2006 | Schmidt et al. |
| 2007/0178882 A1* | 8/2007 | Teunissen ............ H04L 63/18 |
| | | 455/411 |
| 2009/0168977 A1 | 7/2009 | Galvin |
| 2014/0330560 A1 | 11/2014 | Venkatesha et al. |
| 2015/0142438 A1* | 5/2015 | Dai ................ G10L 17/04 |
| | | 704/275 |
| 2016/0057139 A1* | 2/2016 | McDonough ........ H04L 63/168 |
| | | 726/6 |
| 2016/0094529 A1* | 3/2016 | Mityagin ............ H04L 63/08 |
| | | 726/23 |
| 2016/0125879 A1 | 5/2016 | Lovitt |
| 2016/0165381 A1 | 6/2016 | Kapoor et al. |
| 2017/0134944 A1* | 5/2017 | Christian ............ H04W 8/183 |
| 2018/0190290 A1 | 7/2018 | Campbell et al. |
| 2018/0234411 A1* | 8/2018 | Masiero ............ H04L 63/0853 |
| 2019/0219976 A1 | 7/2019 | Giorgi et al. |
| 2019/0303553 A1* | 10/2019 | Choiniere ............ G06F 21/32 |
| 2019/0325892 A1 | 10/2019 | Chenier et al. |
| 2019/0333522 A1* | 10/2019 | Lesso ................ G10L 17/06 |
| 2020/0106776 A1* | 4/2020 | Ito ............ H04L 63/083 |
| 2020/0137046 A1* | 4/2020 | Sharma ............ H04L 63/0853 |
| 2020/0258502 A1 | 8/2020 | Mitchell et al. |
| 2020/0349966 A1 | 11/2020 | Konzelmann et al. |
| 2021/0073362 A1* | 3/2021 | Alameh ............ H04W 12/06 |
| 2021/0136066 A1* | 5/2021 | Llamas Virgen ..... H04L 63/101 |
| 2021/0160335 A1 | 5/2021 | Bellet et al. |

OTHER PUBLICATIONS

Office Action for U.S. Appl. No. 16/712,613, mailed on Oct. 4, 2021, Peng, "Presence Ground Truth Approximation and Utilization", 33 pages.

* cited by examiner

AUTHENTICATING A USER PROFILE WITH DEVICES

RELATED APPLICATIONS

This application claims priority to and is a continuation of U.S. patent application Ser. No. 16/712,613, filed on Dec. 12, 2019, now U.S. Pat. No. 11,437,043 issued on Sep. 6, 2022, the entire contents of which are incorporated herein by reference.

BACKGROUND

Electronic devices can now be used to assist in user tasks and/or for communication purposes. Some tasks may be specific to a person utilizing the electronic devices. Described herein are improvements in technology and solutions to technical problems that can be used to, among other things, assist users in utilizing electronic devices to assist in user tasks and/or for communication purposes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
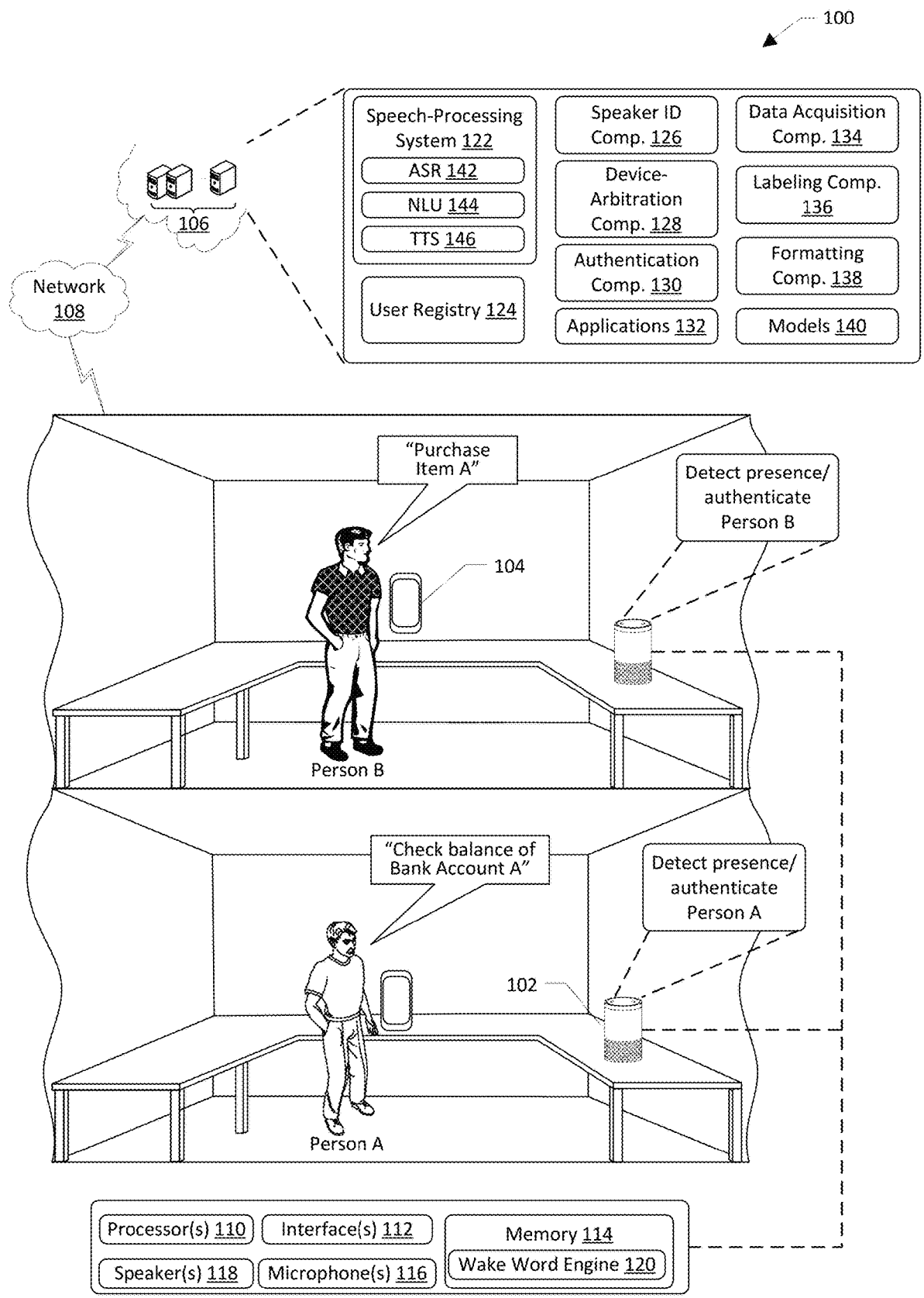
FIG. 1 illustrates a schematic diagram of an example environment for presence ground truth approximation and utilization.

Systems and methods for presence ground truth approximation and utilization are disclosed. Take, for example, an environment such as a home where one or more users reside. Such users may each be associated with a user profile, which may include information associated with the users. For examples, a given user profile may include information associated with historical device usage, settings, preferences, applications that are enabled for use in association with the user profile, speaker identification data indicating audio signatures and/or other data for identifying the user, associated personal devices, etc. The environment may also include one or more devices, also described herein as "electronic devices," that may be utilized by the users. For example, the electronic devices may include voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. Each user may have his or her own user profile that may be utilized to operate electronic devices. For example, a first user profile may be associated with first account data that provides access to certain functionality and/or resources utilizing the electronic devices associated with the first user profile, while the second user profile may be associated with second account data that provides access to the same or different functionality and/or resources.

The electronic devices, and/or a remote system associated with the electronic devices, may be configured to perform one or more actions associated with the user profiles. For example, a user may speak a user utterance and microphones of the electronic device may capture that audio and generate corresponding audio data. The audio data may be utilized by the electronic device and/or the remote system to perform speaker identification processes. For example, a given user profile may include one or more reference audio signatures that may be distinctive to the user associated with the user profile. A speaker identification component may be utilized to analyze a sample audio signature from the audio data in association with the reference audio signatures to determine whether the sample audio signature corresponds to at least one of the reference audio signatures and a confidence value associated with such a determination. For example, a device identifier associated with the electronic device from which the audio data was generated may be utilized to determine account data associated with the electronic device. The account data may be utilized to determine one or more user profiles associated with the account data. The user profiles may be queried for the reference audio signatures and a candidate set of reference audio signatures may be identified. The speaker identification component may then analyze the candidate set of reference audio signatures against the sample audio signature from the audio data to determine a confidence value associated with how closely the sample audio signature corresponds to each or some of the reference audio signatures. The reference audio signature with the most favorable confidence value may be selected and may indicate which user profile the audio data is associated with.

In other examples, the electronic device may "wake" and perform processes associated with the user utterance in situations where the electronic device detects a wake word from the audio data. For example, audio representing the user utterance may be received at the microphones of the electronic device and corresponding audio data may be generated. A digital signal processor of the electronic device may analyze the audio data in association with reference audio signatures to determine whether the audio data includes the wake word. In examples, a given environment may include multiple electronic devices that operate utilizing wake word functionality. In these examples, some or all of the electronic devices may detect the wake word from the same user utterance. An indication of which electronic devices detected the wake word may be sent to the remote system, and in examples the audio data representing the user utterance may be sent to the remote system from the electronic devices that detected the wake word.

In still other examples, one or more user profile authentication processes may be performed when a user interacts with the electronic devices. For example, when a user requests performance of an action utilizing the electronic device, some of those actions may involve one or more applications that may be utilized to perform the actions. In some examples, the application and/or the remote system may not impose authentication criteria on the use of such applications, such as in situations where the requested action does not involve sensitive information and/or is not user profile specific. In other examples, a given application and/or the remote system may impose authentication criteria. Examples of authentication criteria may include determining an identity of the user making the user utterance, such as through audio data analysis, image data analysis, biometric analysis, device-association analysis, etc. An example scenario where authentication criteria may be utilized includes when a user requests information associated with a bank account and/or health-related appointments. In these examples, the audio data corresponding to the request may be sent to the remote system, which may perform speech processing to determine intent data indicating that an application associated with the request, here a banking or health application, is to be utilized to provide a response. Based on the type of application and/or data associated with the application, authentication processes may be performed to determine whether the audio data, image data, etc. associated with the user corresponds to reference data associated with a user profile of the user. If the authentication processing succeeds, the application may be utilized to provide a response to the user, such as outputting audio indicating a bank account balance and/or providing information on a health-related appointment.

In these and other examples where a speaker identification event and/or authentication event is determined, the system may utilize this information to assist in training one or more models, such as machine-learning models, to more accurately detect the presence of a predefined subject and/or to authenticate a user profile. It should be understood that when a predefined subject is described herein, that subject may include a human and/or a non-human subject, such as another electronic device, an animal, a robot, etc. For example, an indication that a speaker identification event and/or an authentication event has been determined may be received at the remote system. In examples, the speaker identification component of the remote system or the electronic device may perform the speaker identification processes described herein and an indication of successful speaker identification may be received. Additional information associated with the speaker identification processes may also be received, such as the confidence value associated with determining the speaker identification data. In examples, a threshold confidence value may be determined and the presence ground truth approximation operations described herein may proceed in situations whether the confidence value satisfies the threshold confidence value. In other examples, a device-arbitration component of the remote system may receive audio data from the electronic devices associated with given account data and may determine which electronic devices detected a wake word and which electronic devices did not detect a wake word. The device-arbitration component may be utilized to determine which electronic devices are associated with a given event and which electronic devices are not associated with the given event. In still other examples, an authentication component of the remote system may determine when authentication criteria is successfully met in association with the use of one or more electronic devices. An indication of successful authentication processing may be generated and utilized to determine which electronic devices are associated with the authentication event.

Utilizing one or more of the methodologies described above to detect a speaker identification event and/or an authentication event, a data acquisition component of the remote system may query one or more databases for data associated with the electronic devices associated with the event and/or the authentication event. For example, the data acquisition component may determine a period of time prior to the event and/or the authentication event to associate with the event. The period of time may be static and may be, for example, 1 minute, 2 minutes, 3 minutes, 5 minutes, or longer from the time of the event. In other examples, the period of time may be dynamic and may be based at least in part on the electronic devices at issue, the account data, the user profile, the confidence value associated with the detection of the event, historically-utilized periods of time, and/or output of machine-learning models trained to determine viability of data for approximating presence ground truths.

The data acquisition component may then query the one or more databases for data associated with the period of time. The one or more databases may include a user registry indicating data associated with the electronic devices at issue and/or one or more data stores that include data indicating historical usage of the electronic devices. The data types of the data to be queried may include, for example, speaker identification data, authentication data, intent data, device-connectivity data, and/or data types determined to impact the confidence of detecting presence and/or authentication by a machine-learning model. For example, the speaker identification data may indicate the successful or failed speaker identification processes performed in association with audio data from the devices at issue. The authentication data may indicate authentication of one or more subjects in association with the devices at issue. The intent data may indicate intents associated with one or more user utterances received at the devices at issue. The device-connectivity data may indicate one or more accessory devices, such as personal devices associated with a given user profile, communicatively coupled to the devices at issue. It should be understood that while several example data types are provided herein, those data types are provided by way of illustration only and not as a limitation. This disclosure includes additional data types that may indicate and/or inform the presence of a subject and/or the authentication of the subject.

A labeling component of the remote system may receive the acquired data from the data acquisition component and may be configured to generate labeling data to associate with the acquired data. For example, the labeling data may include an indication that the acquired data is associated with the speaker identification event and/or authentication event and is to be utilized for training and/or testing one or more models configured to detect presence and/or to authenticate user profiles. In examples where the speaker identification processes and/or the authentication processes are utilized as described above, the labeling component may positively label the acquired data for utilization in model training and/or testing. In examples where the wake-word detection processes are utilized, the data associated with devices that detected the wake word may be positively labeled and some or all of the data associated with devices that did not detect the wake word may be negatively labeled. By so doing, the system may utilize the labeling component to determine which data should be associated with an approximated ground truth that presence has been detected and which data should be associated with an approximated ground truth that presence has not been detected. For example, in a given time window of 5 minutes, a first electronic device may receive multiple user utterances. In examples where the speaker identification event and/or authentication event is detected for that first electronic device, data associated with the multiple user utterances may be positively labeled for model training and/or testing. A second electronic device associated with the first electronic device may not have detected a wake word for the last user utterance but may have also received user utterances during the 5-minute time window. In these examples, data associated with the other user utterances may be negatively labeled as not corresponding to the presence and/or authentication event and may be utilized for model training and/or testing.

A formatting component may receive the labeling data and/or the acquired data and may generate formatted data. The formatted data may be formatted for input into the one or more models utilized to detect presence and/or authentication events. For example, formatting of the data may include generating one or more features and/or feature vectors for the data, where the features and/or feature vectors represent input types that the models have been trained to utilize. The features may be individual measurable properties and/or characteristics of an observed outcome the model(s) have been trained to determine. The features may be numeric and/or may include one or more strings and/or graphs. In examples, the features may correspond to an explanatory variable, such as when statistical techniques are utilized when generating and/or utilizing models. The features may be utilized as inputs by the models to predict the designated outcome, as described herein.

The models may be configured to utilize the formatted data for training and/or testing purposes. For example, a given data set may be separated into data utilized for training and data utilized for testing. Training of the models may include, for example, selecting a training population of the data on which to train the model(s). Selection of the training population may include selecting data associated with a group of user accounts and/or devices and/or selecting data associated with a given period of time. Features associated with the data may be identified and/or selected and may be utilized as inputs to the model(s). Training of models may also include and/or be described herein as model fitting. Model fitting may be based at least in part on historical data. For example, once an event is selected, historical data indicating what data and/or data types may be relevant to predicting the event may be utilized. The models may be modified and/or otherwise configured, based at least in part on the historical data, to utilize the data and/or data types relevant to the event to predict the event. Model fitting may include techniques such as linear regression and/or nonlinear regression.

Additionally, or alternatively, while the data may be independent of each other, an association between data belonging to the same account data may be identified and utilized when performing model testing. In these examples, a group of data belonging to a first set of user profiles may be used for training purposes while another group of data belonging to a second set of user profiles may be used for testing purposes. By maintaining an association between groups, data may be split into the two groups without introducing leakage and/or overlap to the testing process. It should be understood that while the models described herein are described in several examples as being associated with machine-learning models, the models may include other models that do not include a machine-learning component.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for presence ground truth approximation and utilization. The system 100 may include, for example, electronic devices 102, which may include communal devices, personal devices, and/or devices configured with sensors to detect environmental changes. In certain examples, at least some of the devices 102 may be voice-enabled devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The system 100 may also include one or more personal devices 104, which may be electronic devices, such as a mobile phone, tablet, laptop, wearable device, and/or other computing device that is specifically associated with a given user profile. The electronic devices 102 and the personal devices 104 may be configured to send data to and/or receive data from a remote system 106, such as via a network 108. Additionally, it should be understood that a given space and/or environment may include numerous electronic devices 102 and/or personal devices 104. It should also be understood that when a "space" or "environment" is used herein, those terms mean an area and not necessarily a given room, building, or other structure, unless otherwise specifically described as such.

The electronic devices 102 may include one or more components, such as, for example, one or more processors 110, one or more network interfaces 112, memory 114, one or more microphones 116, and/or one or more speakers 118. The microphones 116 may be configured to capture audio, such as user utterances, and generate corresponding audio data. The speakers 118 may be configured to output audio, such as audio corresponding to audio data received from another device and/or the system 106. It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. The memory 114 may include one or more components such as, for example, a wake word engine 120, which will be described in more detail below. It should be understood that when voice-enabled devices are described herein, those voice-enabled devices may include phones, computers, and/or other computing devices.

The remote system 106 may include components such as, for example, a speech-processing system 122, a user registry 124, a speaker identification component 126, a device-arbitration component 128, an authentication component 130, one or more applications 132, a data acquisition component 134, a labeling component 136, a formatting component 138, and/or one or more models 140. It should be understood that while the speech-processing system 122 and the other components are depicted as separate from each other in FIG. 1, some or all of the components may be a part of the same system. The speech-processing system 122 may include an automatic speech recognition component (ASR) 142, a natural language understanding component (NLU) 144, and/or a text-to-speech component (TTS) 146. Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component 144 and/or as determined from user input via a computing device. Skills may be configured to utilize the intent to output data for input to the TTS component 146, a link or other resource locator for audio data, and/or a command to a device, such as the device 102.

In instances where a voice-enabled device is utilized, skills may extend the functionality of devices 102 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device, and send data and/or instructions associated with the input to one or more other devices.

The components of the remote system 106 are described in detail below. In examples, some or each of the components of the remote system 106 may include their own processor(s), network interface(s), and/or memory. As such, by way of example, the speech-processing system 122 may include and/or be associated with processor(s), network interface(s), and/or memory. The other components of the remote system 106, such as the speaker identification component 126, may include and/or be associated with different processor(s), network interface(s), and/or memory, or one or more of these components may utilize some or all of the same processor(s), network interface(s), and/or memory utilized by the speech-processing system 122. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 124 may be configured to determine and/or generate associations between users, user accounts, and/or devices. For example, one or more associations between user accounts may be identified, determined, and/or generated by the user registry 124. The user registry 124 may additionally store information indicating one or more applications and/or resources accessible to and/or enabled for a given user account. Additionally, the user registry 124 may include information indicating device identifiers, such as naming identifiers, associated with a given user account, as well as device types associated with the device identifiers. The user registry 124 may also include information indicating user account identifiers, naming indicators of devices associated with user accounts, and/or associations between devices, such as the devices 102. The user registry 124 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 122 may be configured to receive audio data from the devices 102 and/or other devices and perform speech-processing operations. For example, the ASR component 142 may be configured to generate text data corresponding to the audio data, and the NLU component 144 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "purchase Item A," the NLU component 144 may identify a "purchase" intent and the payload may be "Item A." In this example where the intent data indicates an intent to initiate a payment transaction for purchasing "Item A," the speech-processing system 122 may call one or more speechlets to effectuate the intent. Speechlets, as described herein may otherwise be described as applications and may include functionality for utilizing intent data to generate directives and/or instructions. For example, a communications speechlet may be called when the intent indicates that an action is to be performed associated with establishing a communication channel with another device. The speechlet may be designated as being configured to handle the intent of establishing a communication channel, for example. The speechlet may receive the intent data and/or other data associated with the user utterance from the NLU component 144, such as by an orchestrator of the remote system 106, and may perform operations to instruct the device 102 to perform an operation. For example, a shopping speechlet may retrieve a user profile associated with the request may cause the item to be purchased utilizing purchasing information associated with the user profile. The remote system 106 may generate audio data confirming that a communication channel has been established, such as by the TTS component 146. The audio data may be sent from the remote system 106 to the device 102 for output of corresponding audio by the speakers 118 of the device 102.

The speaker identification component 126 may be utilized to analyze a sample audio signature from audio data in association with reference audio signatures to determine whether a sample audio signature corresponds to at least one of the reference audio signatures and a confidence value associated with such a determination. For example, a device identifier associated with the electronic device 102 from which the audio data was generated may be utilized to determine account data associated with the electronic device 102. The account data may be utilized to determine one or more user profiles associated with the account data. The user profiles may be queried for the reference audio signatures and a candidate set of reference audio signatures may be identified. The speaker identification component 126 may then analyze the candidate set of reference audio signatures against the sample audio signature from the audio data to determine a confidence value associated with how closely the sample audio signature corresponds to each or some of the reference audio signatures. The reference audio signature with the most favorable confidence value may be selected and may indicate which user profile the audio data is associated with.

In other examples, the electronic device 102 may "wake" and perform processes associated with the user utterance in situations where the electronic device detects a wake word from the audio data. For example, audio representing the user utterance may be received at the microphones 116 of the electronic device 102 and corresponding audio data may be generated. A digital signal processor may utilize the wake word engine 120 of the electronic device 102 to analyze the audio data in association with reference audio signatures to determine whether the audio data includes the wake word. In examples, a given environment may include multiple electronic devices 102 that operate utilizing wake word functionality. In these examples, some or all of the electronic devices 102 may detect the wake word from the same user utterance. An indication of which electronic devices 102 detected the wake word may be sent to the remote system 106, and in examples the audio data representing the user utterance may be sent to the remote system 106 from the electronic devices 102 that detected the wake word.

In still other examples, one or more user profile authentication processes may be performed when a user interacts with the electronic devices 102. For example, when a user requests performance of an action utilizing the electronic device 102, some of those actions may involve one or more applications 132 that may be utilized to perform the actions. In some examples, the application 132 and/or the remote system 106 may not impose authentication criteria on the use of such applications 132, such as in situations where the requested action does not involve sensitive information and/or is not user profile specific. In other examples, a given application 132 and/or the remote system 106 may impose authentication criteria. Examples of authentication criteria may include determining an identity of the user making the user utterance, such as through audio data analysis, image data analysis, biometric analysis, device-association analysis, etc. An example scenario where authentication criteria may be utilized includes when a user requests information associated with a bank account and/or health-related appointments. In these examples, the audio data corresponding to the request may be sent to the remote system 106, which may perform speech processing to determine intent data indicating that an application 132 associated with the request, here a banking or health application, is to be utilized to provide a response. Based on the type of application 132 and/or data associated with the application 132, the authentication component 130 may perform authentication processes to determine whether the audio data, image data, etc. associated with the user corresponds to reference data associated with a user profile of the user. If the authentication processing succeeds, the application 132 may be utilized to provide a response to the user, such as outputting audio indicating a bank account balance and/or providing information on a health-related appointment. The authentication processes performed by the authentication component 130 may include speaker recognition, facial recognition, device recognition, biometric signature recognition, user input validation, etc.

In these and other examples where a speaker identification event and/or authentication event is determined, the system 100 may utilize this information to assist in training one or more models 140, such as machine-learning models, to more accurately detect the presence of a predefined subject and/or to authenticate a user profile. It should be understood that when a predefined subject is described herein, that subject may include a human and/or a non-human subject, such as another electronic device, an animal, a robot, etc. For example, an indication that a speaker identification event and/or an authentication event has been determined may be received at the remote system 106. In examples, the speaker identification component 126 of the remote system 106 or the electronic device 102 may perform the speaker identification processes described herein and an indication of successful speaker identification may be received. Additional information associated with the speaker identification processes may also be received, such as the confidence value associated with determining the speaker identification data. In examples, a threshold confidence value may be determined and the presence ground truth approximation operations described herein may proceed in situations whether the confidence value satisfies the threshold confidence value. In other examples, the device-arbitration component 128 of the remote system 106 may receive audio data from the electronic devices 102 associated with given account data and may determine which electronic devices 102 detected a wake word and which electronic devices 102 did not detect a wake word. The device-arbitration component 128 may be utilized to determine which electronic devices 102 are associated with a given speaker identification event and which electronic devices 102 are not associated with the given speaker identification event. In still other examples, the authentication component 130 may determine when authentication criteria is successfully met in association with the use of one or more electronic devices 102. An indication of successful authentication processing may be generated and utilized to determine which electronic devices 102 are associated with the authentication event.

Utilizing one or more of the methodologies described above to detect a speaker identification event and/or an authentication event, the data acquisition component 134 query one or more databases for data associated with the electronic devices 102 associated with the speaker identification event and/or the authentication event. For example, the data acquisition component 134 may determine a period of time prior to the speaker identification event and/or the authentication event to associate with the event. The period of time may be static and may be, for example, 1 minute, 2 minutes, 3 minutes, 5 minutes, or longer from the time of the event. In other examples, the period of time may be dynamic and may be based at least in part on the electronic devices 102 at issue, the account data, the user profile, the confidence value associated with the detection of the event, historically-utilized periods of time, and/or output of machine-learning models trained to determine viability of data for approximating presence ground truths.

The data acquisition component 134 may then query the one or more databases for data associated with the period of time. The one or more databases may include the user registry 124 indicating data associated with the electronic devices 102 at issue and/or one or more data stores that include data indicating historical usage of the electronic devices 102. The data types of the data to be queried may include, for example, speaker identification data, authentication data, intent data, device-connectivity data, and/or data types determined to impact the confidence of detecting presence and/or authentication by a machine-learning model. For example, the speaker identification data may indicate the successful or failed speaker identification processes performed in association with audio data from the devices 102 at issue. The authentication data may indicate authentication of one or more subjects in association with the devices 102 at issue. The intent data may indicate intents associated with one or more user utterances received at the devices 102 at issue. The device-connectivity data may indicate one or more accessory devices, such as personal devices 104 associated with a given user profile, communicatively coupled to the devices 102 at issue. It should be understood that while several example data types are provided herein, those data types are provided by way of illustration only and not as a limitation. This disclosure includes additional data types that may indicate and/or inform the presence of a subject and/or the authentication of the subject.

The labeling component 136 may receive the acquired data from the data acquisition component 134 and may be configured to generate labeling data to associate with the acquired data. For example, the labeling data may include an indication that the acquired data is associated with the speaker identification event and/or authentication event and is to be utilized for training and/or testing one or more models 140 configured to detect presence and/or to authenticate user profiles. In examples where the speaker identification processes and/or the authentication processes are utilized as described above, the labeling component 136 may positively label the acquired data for utilization in model training and/or testing. In examples where the wake-word detection processes are utilized, the data associated with devices 102 that detected the wake word may be positively labeled and some or all of the data associated with device 102 that did not detect the wake word may be negatively labeled. By so doing, the system 100 may utilize the labeling component 136 to determine which data should be associated with an approximated ground truth that presence has been detected and which data should be associated with an approximated ground truth that presence has not been detected. For example, in a given time window of 5 minutes, a first electronic device 102 may receive multiple user utterances. In examples where the speaker identification event and/or authentication event is detected for that first electronic device 102, data associated with the multiple user utterances may be positively labeled for model training and/or testing. A second electronic device 102 associated with the first electronic device 102 may not have detected a wake word for the last user utterance but may have also received user utterances during the 5-minute time window. In these examples, data associated with the other user utterances may be negatively labeled as not corresponding to the presence and/or authentication event and may be utilized for model training and/or testing.

The formatting component 138 may receive the labeling data and/or the acquired data and may generate formatted data. The formatted data may be formatted for input into the one or more models 140 utilized to detect presence and/or authentication events. For example, formatting of the data may include generating one or more features and/or feature vectors for the data, where the features and/or feature vectors represent input types that the models have been trained to utilize. The features may be individual measurable properties and/or characteristics of an observed outcome the model(s) have been trained to determine. The features may be numeric and/or may include one or more strings and/or graphs. In examples, the features may correspond to an explanatory variable, such as when statistical techniques are utilized when generating and/or utilizing models 140. The features may be utilized as inputs by the models 140 to predict the designated outcome, as described herein.

The models 140 may be configured to utilize the formatted data for training and/or testing purposes. For example, a given data set may be separated into data utilized for training and data utilized for testing. Training of the models 140 may include, for example, selecting a training population of the data on which to train the model(s) 140. Selection of the training population may include selecting data associated with a group of user accounts and/or devices and/or selecting data associated with a given period of time. Features associated with the data may be identified and/or selected and may be utilized as inputs to the model(s) 140. Training of models 140 may also include and/or be described herein as model fitting. Model fitting may be based at least in part on historical data. For example, once an event is selected, historical data indicating what data and/or data types may be relevant to predicting the event may be utilized. The models 140 may be modified and/or otherwise configured, based at least in part on the historical data, to utilize the data and/or data types relevant to the event to predict the event. Model fitting may include techniques such as linear regression and/or nonlinear regression.

Additionally, or alternatively, while the data may be independent of each other, an association between data belonging to the same account data may be identified and utilized when performing model testing. In these examples, a group of data belonging to a first set of user profiles may be used for training purposes while another group of data belonging to a second set of user profiles may be used for testing purposes. By maintaining an association between groups, data may be split into the two groups without introducing leakage and/or overlap to the testing process. It should be understood that while the models described herein are described in several examples as being associated with machine-learning models, the models may include other models that do not include a machine-learning component.

Once model training and/or testing has been performed, the machine-learning models 160 may identify one or more data types that indicate presence and/or that may be utilized to authenticate a user profile. In these example, the system may receive data of the data type from the one or more devices associated with the account data. For example, data may be generated by the first electronic device, or another device, indicating one or more environmental changes, such as detection of the second wireless signal, speaker identification data, intent data, etc. The environmental changes may be detected by one or more sensors of the device, such as one or more microphones, cameras, electronic device beacons, GPS components, etc. That data may be received and formatted for input into the machine-learning model. The model 160 may determine a similarity between the sample data and the data previously identified as being indicative of the outcome at issue, such as detection of presence. For example, comparisons between data having the data type(s) determined utilizing the ground truthing processes described above may be performed. When sample data corresponds to data determined to indicate presence and/or authentication, for example, then a similarity may be determined and utilized. In these example, the system may determine that a second speaker identification event has occurred from the similarity. For example, the machine-learning model, having been trained and/or tested as discussed herein, may utilize the data representing the environmental change to determine if the data indicates presence of a subject and/or one or more other outputs that the machine-learning model is configured to determine. The machine-learning model may also determine a confidence value associated with detection of the determined output. In examples, the confidence value may indicate more confidence than the machine-learning model would have determined absent training and/or testing as described herein.

The models 140 described herein may utilize predictive analytics to predict one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models 140, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models 140. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the remote system 106 and the associated functionality of those components as described herein may be performed by one or more of the electronic devices 102 and/or personal devices 104. Additionally, or alternatively, some or all of the components and/or functionalities associated with the electronic devices 102 and/or personal devices 104 may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 106 may possess its own local memory, which also may store program components, program data, and/or one or more operating systems.

The memory 114 and/or the memory described with respect to the components of the remote system 106 may include volatile and nonvolatile memory, removable and non-removable media implemented in any method or technology for storage of information, such as computer-readable instructions, data structures, program component, or other data. Such memory 114 and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the remote system 106 may be implemented as computer-readable storage media ("CRSM"), which may be any available physical media accessible by the processor(s) 110 and/or the processor(s) described with respect to the remote system 106 to execute instructions stored on the memory 114 and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 112 and/or the network interface(s) described with respect to the components of the remote system 106 may enable messages between the components and/or devices shown in system 100 and/or with one or more other polling systems, as well as other networked devices. Such network interface(s) 112 and/or the network interface(s) described with respect to the components of the remote system 106 may include one or more network interface controllers (NICs) or other types of transceiver devices to send and receive messages over the network 108.

For instance, each of the network interface(s) 112 and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or the network interface(s) described with respect to the components of the remote system 106 may include a wide area network (WAN) component to enable message over a wide area network.

In some instances, the remote system 106 may be local to an environment associated the electronic devices 102 and/or personal devices 104. For instance, the remote system 106 may be located within one or more of the electronic devices 102 and/or personal devices 104. In some instances, some or all of the functionality of the remote system 106 may be performed by one or more of the electronic devices 102 and/or personal devices 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2:
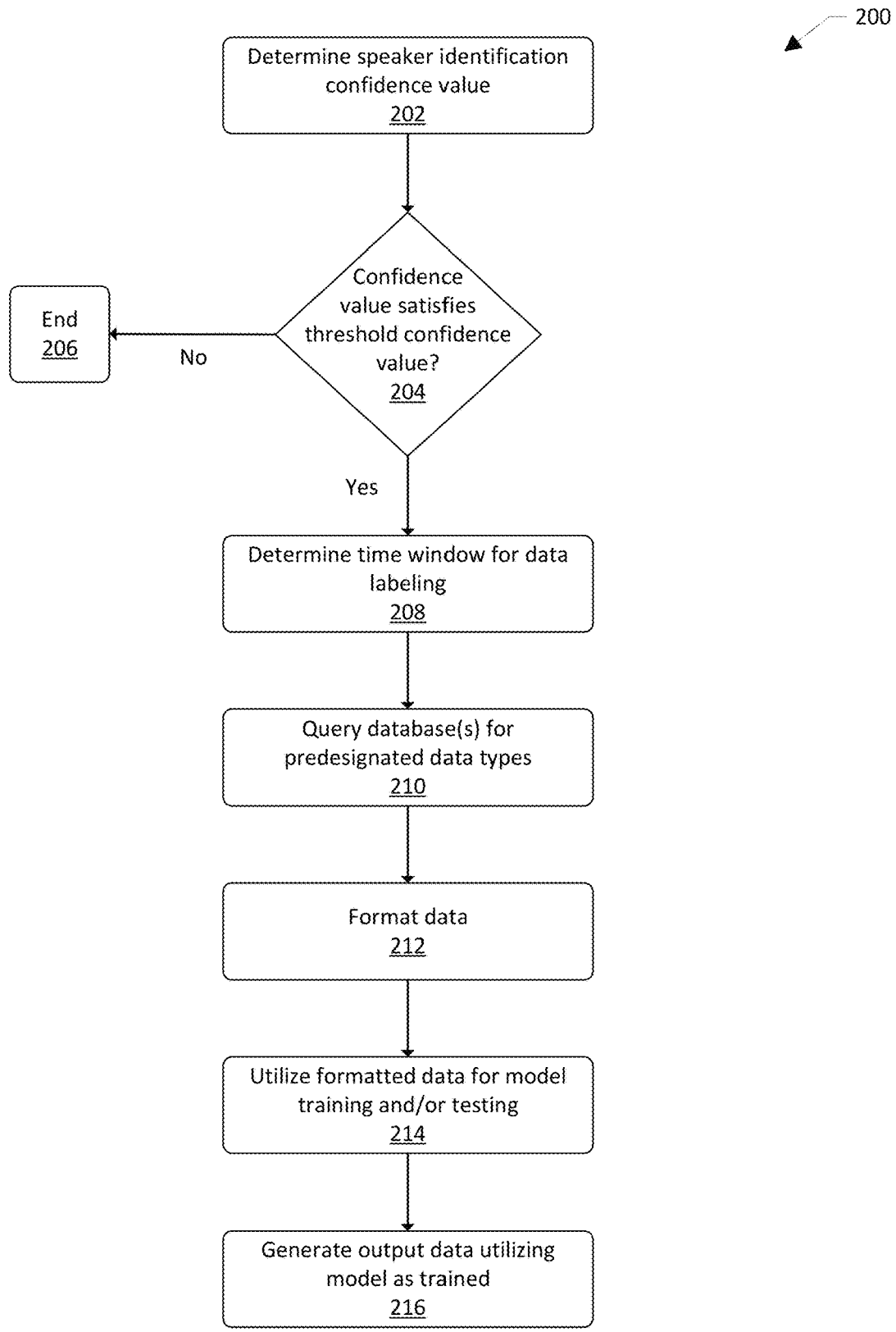
FIG. 2 illustrates a flow diagram of an example process for presence ground truth approximation utilizing speaker identification processes.
Figure 3:
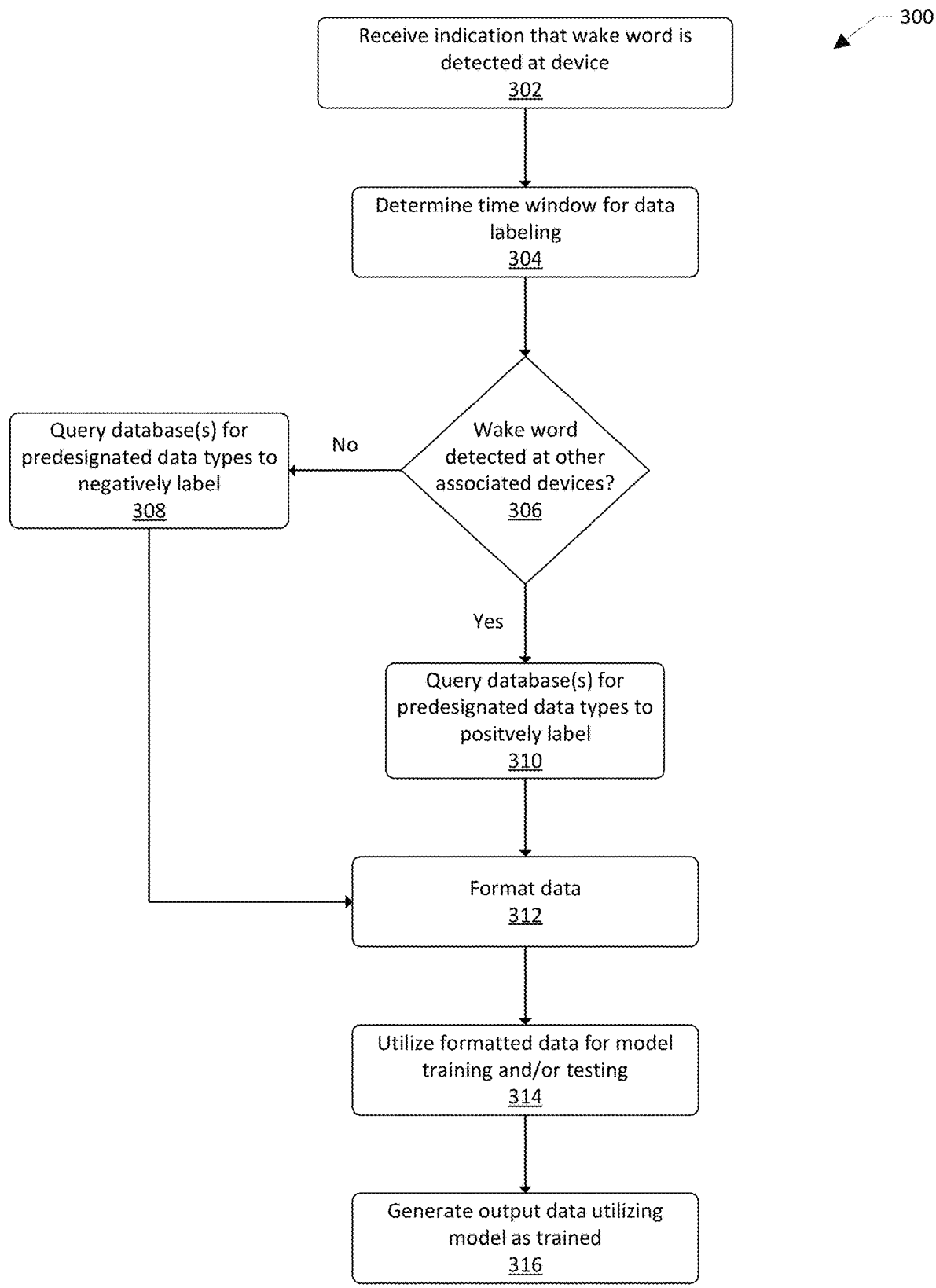
FIG. 3 illustrates a flow diagram of an example process for presence ground truth approximation utilizing wake-word detection processes.
Figure 4:
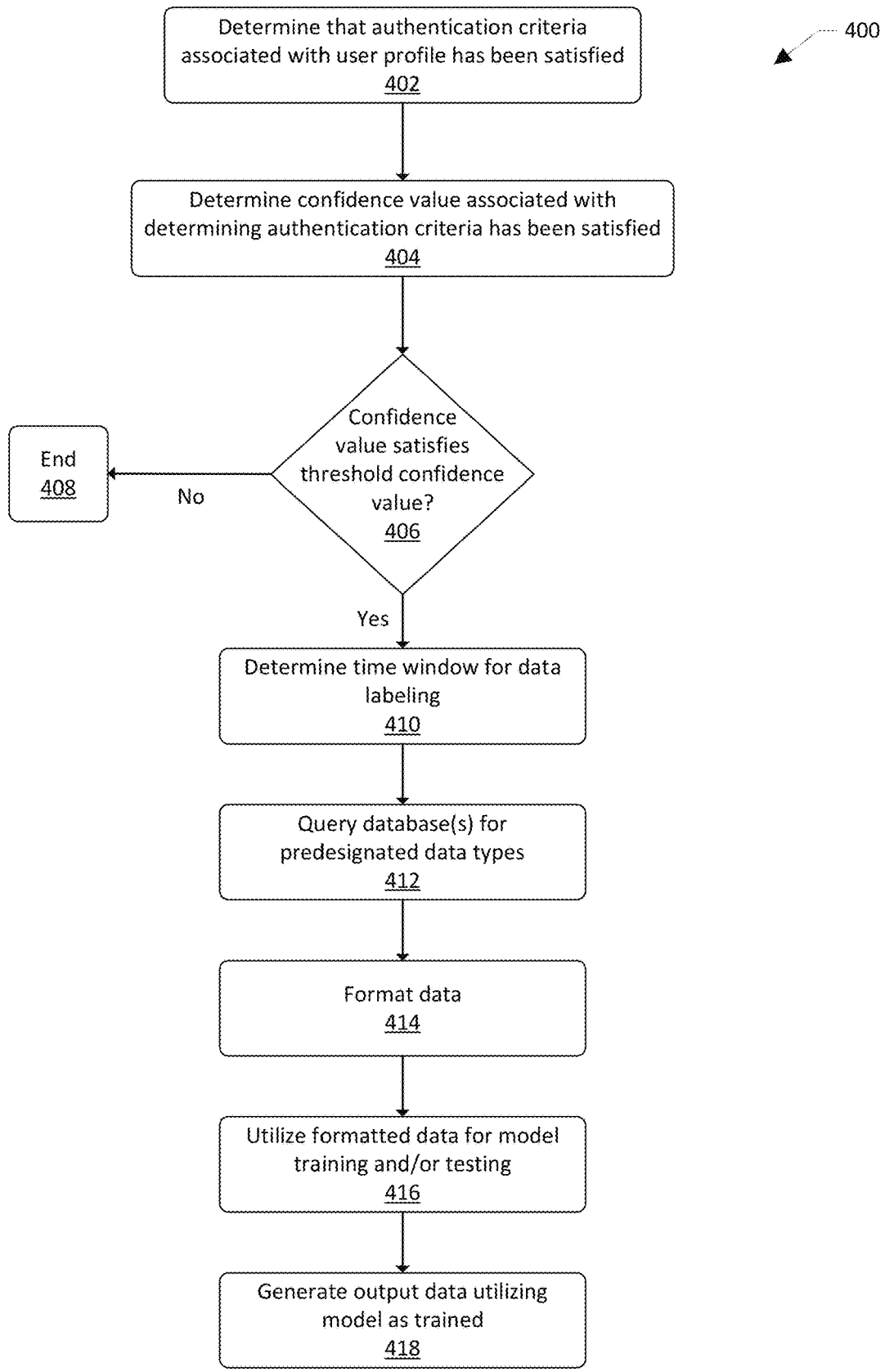
FIG. 4 illustrates a flow diagram of an example process for presence ground truth approximation utilizing authentication-based processes.

FIGS. 2-4 illustrate processes for presence ground truth approximation and utilization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 5-9, although the processes may be implemented in a wide variety of other environments, architectures and systems.

FIG. 2 illustrates a flow diagram of an example process 200 for presence ground truth approximation utilizing speaker identification processes. The order in which the operations or steps are described is not intended to be construed as a limitation, and any number of the described operations may be combined in any order and/or in parallel to implement process 200.

At block 202, the process 200 may include determining a speaker identification confidence value. For example, a speaker identification component may be utilized to analyze a sample audio signature from audio data in association with reference audio signatures to determine whether a sample audio signature corresponds to at least one of the reference audio signatures and a confidence value associated with such a determination. For example, a device identifier associated with an electronic device from which the audio data was generated may be utilized to determine account data associated with the electronic device. The account data may be utilized to determine one or more user profiles associated with the account data. The user profiles may be queried for the reference audio signatures and a candidate set of reference audio signatures may be identified. The speaker identification component may then analyze the candidate set of reference audio signatures against the sample audio signature from the audio data to determine how closely the sample audio signature corresponds to each or some of the reference audio signatures. The speaker identification component may analyze the candidate set of reference audio signatures against the sample audio signature from the audio data to determine a confidence value associated with how closely the sample audio signature corresponds to each or some of the reference audio signatures. The reference audio signature with the most favorable confidence value may be selected and may indicate which user profile the audio data is associated with.

At block 204, the process 200 may include determining whether the confidence value satisfies a threshold confidence value. In examples, a confidence value scale may be identified and utilized to determine a relative confidence that a given audio signature corresponds to a reference audio signature. For example, a scale of 1 to 10 or a bin system, for example bins 1 through 5, may be developed and utilized. The threshold confidence value may be determined, and may be associated with the scale.

If the confidence value does not satisfy the threshold confidence value, then at block 206 the process 200 may end. In these examples, ground truth approximation is not performed because the system could not determine with enough confidence that a given subject was present and/or that authentication of the user profile to be utilized succeeded. As such, the system may determine to refrain from labeling and utilizing prior data to train the one or more models described herein.

If the confidence value satisfies the threshold confidence value, then at block 208 the process 200 may include determining a time window for data labeling. For example, a data acquisition component may determine a period of time prior to the speaker identification event and/or the authentication event to associate with the event. The period of time may be static and may be, for example, 1 minute, 2 minutes, 3 minutes, 5 minutes, or longer from the time of the event. In other examples, the period of time may be dynamic and may be based at least in part on the electronic devices at issue, the account data, the user profile, the confidence value associated with the detection of the event, historically-utilized periods of time, and/or output of machine-learning models trained to determine viability of data for approximating presence ground truths.

At block 210, the process 200 may include querying one or more databases for data of predesignated data types. For example, the data acquisition component may then query the one or more databases for data associated with the period of time. The one or more databases may include the user registry indicating data associated with the electronic devices at issue and/or one or more data stores that include data indicating historical usage of the electronic devices. The data types of the data to be queried may include, for example, speaker identification data, authentication data, intent data, device-connectivity data, and/or data types determined to impact the confidence of detecting presence and/or authentication by a machine-learning model. For example, the speaker identification data may indicate the successful or failed speaker identification processes performed in association with audio data from the devices at issue. The authentication data may indicate authentication of one or more subjects in association with the devices at issue. The intent data may indicate intents associated with one or more user utterances received at the devices at issue. The device-connectivity data may indicate one or more accessory devices, such as personal devices associated with a given user profile, communicatively coupled to the devices at issue. It should be understood that while several example data types are provided herein, those data types are provided by way of illustration only and not as a limitation. This disclosure includes additional data types that may indicate and/or inform the presence of an subject and/or the authentication of the subject.

At block 212, the process 200 may include formatting the data receiving from the databases. For example, a formatting component may receive labeling data, which may label the acquired data as positively or negatively associated with the speaker identification event, and/or the acquired data and may generate formatted data. The formatted data may be formatted for input into the one or more models utilized to detect presence and/or authentication events. For example, formatting of the data may include generating one or more features and/or feature vectors for the data, where the features and/or feature vectors represent input types that the models have been trained to utilize. The features may be individual measurable properties and/or characteristics of an observed outcome the model(s) have been trained to determine. The features may be numeric and/or may include one or more strings and/or graphs. In examples, the features may correspond to an explanatory variable, such as when statistical techniques are utilized when generating and/or utilizing models. The features may be utilized as inputs by the models to predict the designated outcome, as described herein.

At block 214, the process 200 may include utilizing the formatted data for model training and/or testing. The models may be configured to utilize the formatted data for training and/or testing purposes. For example, a given data set may be separated into data utilized for training and data utilized for testing. Training of the models may include, for example, selecting a training population of the data on which to train the model(s). Selection of the training population may include selecting data associated with a group of user accounts and/or devices and/or selecting data associated with a given period of time. Features associated with the data may be identified and/or selected and may be utilized as inputs to the model(s). Training of models may also include and/or be described herein as model fitting. Model fitting may be based at least in part on historical data. For example, once an event is selected, historical data indicating what data and/or data types may be relevant to predicting the event may be utilized. The models may be modified and/or otherwise configured, based at least in part on the historical data, to utilize the data and/or data types relevant to the event to predict the event. Model fitting may include techniques such as linear regression and/or nonlinear regression.

At block 216, the process 200 may include generating, utilizing the model, data indicating detection of a speaker identification event. For example, the process 200 may include inputting data indicating an environmental change associated with the first electronic device into the model trained as discussed above. For example, data may be generated by the first electronic device, or another device, indicating one or more environmental changes. The environmental changes may be detected by one or more sensors of the device, such as one or more microphones, cameras, electronic device beacons, GPS components, etc. That data may be received and formatted for input into the machine-learning model. The model, having been trained and/or tested as discussed herein, may utilize the data representing the environmental change to determine if the first data indicates presence of a subject and/or one or more other outputs that the machine-learning model is configured to determine. The model may also determine a confidence value associated with detection of the determined output. In examples, the confidence value may indicate more confidence than the model would have determined absent training and/or testing as described herein.

For example, once model training and/or testing has been performed, the machine-learning models may identify one or more data types that indicate presence and/or that may be utilized to authenticate a user profile. In these example, the system may receive data of the data type from the one or more devices associated with the account data. For example, data may be generated by the first electronic device, or another device, indicating one or more environmental changes, such as detection of the second wireless signal, speaker identification data, intent data, etc. The environmental changes may be detected by one or more sensors of the device, such as one or more microphones, cameras, electronic device beacons, GPS components, etc. That data may be received and formatted for input into the machine-learning model. The model may determine a similarity between the sample data and the data previously identified as being indicative of the outcome at issue, such as detection of presence. For example, comparisons between data having the data type(s) determined utilizing the ground truthing processes described above may be performed. When sample data corresponds to data determined to indicate presence and/or authentication, for example, then a similarity may be determined and utilized. In these example, the system may determine that a second speaker identification event has occurred from the similarity. For example, the machine-learning model, having been trained and/or tested as discussed herein, may utilize the data representing the environmental change to determine if the data indicates presence of a subject and/or one or more other outputs that the machine-learning model is configured to determine. The machine-learning model may also determine a confidence value associated with detection of the determined output. In examples, the confidence value may indicate more confidence than the machine-learning model would have determined absent training and/or testing as described herein.

FIG. 3 illustrates a flow diagram of an example process 300 for presence ground truth approximation utilizing wake-word detection processes. The order in which the operations or steps are described is not intended to be construed as a limitation, and any number of the described operations may be combined in any order and/or in parallel to implement process 300.

At block 302, the process 300 may include receiving an indication that a wake word has been detected by a first device. For example, an electronic device may "wake" and perform processes associated with the user utterance in situations where the electronic device detects a wake word from the audio data. For example, audio representing the user utterance may be received at the microphones of the electronic device and corresponding audio data may be generated. A digital signal processor of the electronic device may analyze the audio data in association with reference audio signatures to determine whether the audio data includes the wake word. In examples, a given environment may include multiple electronic devices that operate utilizing wake word functionality. In these examples, some or all of the electronic devices may detect the wake word from the same user utterance. An indication of which electronic devices detected the wake word may be sent to the remote system, and in examples the audio data representing the user utterance may be sent to the remote system from the electronic devices that detected the wake word.

At block 304, the process 300 may include determining a time window for data labeling. For example, a data acquisition component may determine a period of time prior to the speaker identification event and/or the authentication event to associate with the event. The period of time may be static and may be, for example, 1 minute, 2 minutes, 3 minutes, 5 minutes, or longer from the time of the event. In other examples, the period of time may be dynamic and may be based at least in part on the electronic devices at issue, the account data, the user profile, the confidence value associated with the detection of the event, historically-utilized periods of time, and/or output of machine-learning models trained to determine viability of data for approximating presence ground truths.

At block 306, the process 300 may include determining whether the wake word was detected at one or more other associated devices. For example, a device-arbitration component of the remote system may receive audio data from the electronic devices associated with given account data and may determine which electronic devices detected a wake word and which electronic devices did not detect a wake word. The device-arbitration component may be utilized to determine which electronic devices are associated with a given speaker identification event and which electronic devices are not associated with the given speaker identification event.

If the wake word was not detected by at least one other associated device, then at block 308 the process 300 may include querying one or more databases for data of predesignated data types to negatively label. For example, the data acquisition component may then query the one or more databases for data associated with the period of time. The one or more databases may include the user registry indicating data associated with the electronic devices at issue and/or one or more data stores that include data indicating historical usage of the electronic devices. The data types of the data to be queried may include, for example, speaker identification data, authentication data, intent data, device-connectivity data, and/or data types determined to impact the confidence of detecting presence and/or authentication by a machine-learning model. For example, the speaker identification data may indicate the successful or failed speaker identification processes performed in association with audio data from the devices at issue. The authentication data may indicate authentication of one or more subjects in association with the devices at issue. The intent data may indicate intents associated with one or more user utterances received at the devices at issue. The device-connectivity data may indicate one or more accessory devices, such as personal devices associated with a given user profile, communicatively coupled to the devices at issue. It should be understood that while several example data types are provided herein, those data types are provided by way of illustration only and not as a limitation. This disclosure includes additional data types that may indicate and/or inform the presence of a subject and/or the authentication of the subject. In examples where the wake-word detection processes are utilized, the data associated with devices that detected the wake word may be positively labeled and some or all of the data associated with devices that did not detect the wake word may be negatively labeled. By so doing, the system may utilize the labeling component to determine which data should be associated with an approximated ground truth that presence has been detected and which data should be associated with an approximated ground truth that presence has not been detected. For example, in a given time window of 5 minutes, a first electronic device may receive multiple user utterances. In examples where the speaker identification event and/or authentication event is detected for that first electronic device, data associated with the multiple user utterances may be positively labeled for model training and/or testing. A second electronic device associated with the first electronic device may not have detected a wake word for the last user utterance but may have also received user utterances during the 5-minute time window. In these examples, data associated with the other user utterances may be negatively labeled as not corresponding to the presence and/or authentication event and may be utilized for model training and/or testing.

If the wake word was detected by at least one other associated device, then at block 310 the process 300 may include querying the one or more databases for additional data of the predesignated data types to positively label. The databases may be queried in the same or a similar manner as described with respect to block 308, except that the data to be queried is associated with the devices indicated to be associated with the speaker identification event.

At block 312, the process 300 may include formatting the positively labeled data and the negatively labeled data. For example, a formatting component may receive labeling data, which may label the acquired data as positively or negatively associated with the speaker identification event, and/or the acquired data and may generate formatted data. The formatted data may be formatted for input into the one or more models utilized to detect presence and/or authentication events. For example, formatting of the data may include generating one or more features and/or feature vectors for the data, where the features and/or feature vectors represent input types that the models have been trained to utilize. The features may be individual measurable properties and/or characteristics of an observed outcome the model(s) have been trained to determine. The features may be numeric and/or may include one or more strings and/or graphs. In examples, the features may correspond to an explanatory variable, such as when statistical techniques are utilized when generating and/or utilizing models. The features may be utilized as inputs by the models to predict the designated outcome, as described herein.

At block 314, the process 300 may include utilizing the formatted data for model training and/or testing. The models may be configured to utilize the formatted data for training and/or testing purposes. For example, a given data set may be separated into data utilized for training and data utilized for testing. Training of the models may include, for example, selecting a training population of the data on which to train the model(s). Selection of the training population may include selecting data associated with a group of user accounts and/or devices and/or selecting data associated with a given period of time. Features associated with the data may be identified and/or selected and may be utilized as inputs to the model(s). Training of models may also include and/or be described herein as model fitting. Model fitting may be based at least in part on historical data. For example, once an event is selected, historical data indicating what data and/or data types may be relevant to predicting the event may be utilized. The models may be modified and/or otherwise configured, based at least in part on the historical data, to utilize the data and/or data types relevant to the event to predict the event. Model fitting may include techniques such as linear regression and/or nonlinear regression.

At block 316, the process 300 may include generating, utilizing the model, data indicating detection of a speaker identification event. For example, the process 300 may include inputting data indicating an environmental change associated with the first electronic device into the model trained as discussed above. For example, data may be generated by the first electronic device, or another device, indicating one or more environmental changes. The environmental changes may be detected by one or more sensors of the device, such as one or more microphones, cameras, electronic device beacons, GPS components, etc. That data may be received and formatted for input into the machine-learning model. The model, having been trained and/or tested as discussed herein, may utilize the data representing the environmental change to determine if the first data indicates presence of a subject and/or one or more other outputs that the machine-learning model is configured to determine. The model may also determine a confidence value associated with detection of the determined output. In examples, the confidence value may indicate more confidence than the model would have determined absent training and/or testing as described herein.

Once model training and/or testing has been performed, the machine-learning models may identify one or more data types that indicate presence and/or that may be utilized to authenticate a user profile. In these example, the system may receive data of the data type from the one or more devices associated with the account data. For example, data may be generated by the first electronic device, or another device, indicating one or more environmental changes, such as detection of the second wireless signal, speaker identification data, intent data, etc. The environmental changes may be detected by one or more sensors of the device, such as one or more microphones, cameras, electronic device beacons, GPS components, etc. That data may be received and formatted for input into the machine-learning model. The model may determine a similarity between the sample data and the data previously identified as being indicative of the outcome at issue, such as detection of presence. For example, comparisons between data having the data type(s) determined utilizing the ground truthing processes described above may be performed. When sample data corresponds to data determined to indicate presence and/or authentication, for example, then a similarity may be determined and utilized. In these example, the system may determine that a second speaker identification event has occurred from the similarity. For example, the machine-learning model, having been trained and/or tested as discussed herein, may utilize the data representing the environmental change to determine if the data indicates presence of a subject and/or one or more other outputs that the machine-learning model is configured to determine. The machine-learning model may also determine a confidence value associated with detection of the determined output. In examples, the confidence value may indicate more confidence than the machine-learning model would have determined absent training and/or testing as described herein.

FIG. 4 illustrates a flow diagram of an example process 400 for presence ground truth approximation utilizing authentication-based processes. The order in which the operations or steps are described is not intended to be construed as a limitation, and any number of the described operations may be combined in any order and/or in parallel to implement process 400.

At block 402, the process 400 may include determining that authentication criteria associated with a user profile has been satisfied. For example, one or more user profile authentication processes may be performed when a user interacts with the electronic devices. For example, when a user requests performance of an action utilizing the electronic device, some of those actions may involve one or more applications that may be utilized to perform the actions. In some examples, the application and/or the remote system may not impose authentication criteria on the use of such applications, such as in situations where the requested action does not involve sensitive information and/or is not user profile specific. In other examples, a given application and/or the remote system may impose authentication criteria. Examples of authentication criteria may include determining an identity of the user making the user utterance, such as through audio data analysis, image data analysis, biometric analysis, device-association analysis, etc. An example scenario where authentication criteria may be utilized includes when a user requests information associated with a bank account and/or health-related appointments. In these examples, the audio data corresponding to the request may be sent to the remote system, which may perform speech processing to determine intent data indicating that an application associated with the request, here a banking or health application, is to be utilized to provide a response. Based on the type of application and/or data associated with the application, authentication processes may be performed to determine whether the audio data, image data, etc. associated with the user corresponds to reference data associated with a user profile of the user. If the authentication processing succeeds, the application may be utilized to provide a response to the user, such as outputting audio indicating a bank account balance and/or providing information on a health-related appointment.

At block 404, the process 400 may include determining a confidence value associated with determining that the authentication criteria has been satisfied. For example, the authentication component may determine that the user profile is to be authenticated, and may generate a confidence value associated with that determination.

At block 406, the process 400 may include determining whether the confidence value satisfies a threshold confidence value. In examples, a confidence value scale may be identified and utilized to determine a relative confidence that a authentication process was successful. For example, a scale of 1 to 10 or a bin system, for example bins 1 through 5, may be developed and utilized. The threshold confidence value may be determined, and may be associated with the scale.

If the confidence value does not satisfy the threshold confidence value, then at block 408 the process 400 may end. In these examples, ground truth approximation is not performed because the system could not determine with enough confidence that a given subject was present and/or that authentication of the user profile to be utilized succeeded. As such, the system may determine to refrain from labeling and utilizing prior data to train the one or more models described herein.

If the confidence value satisfies the threshold confidence value, then at block 410 the process 400 may include determining a time window for data labeling. For example, a data acquisition component may determine a period of time prior to the authentication event to associate with the event. The period of time may be static and may be, for example, 1 minute, 2 minutes, 3 minutes, 5 minutes, or longer from the time of the event. In other examples, the period of time may be dynamic and may be based at least in part on the electronic devices at issue, the account data, the user profile, the confidence value associated with the detection of the event, historically-utilized periods of time, and/or output of machine-learning models trained to determine viability of data for approximating presence ground truths.

At block 412, the process 400 may include querying one or more databases for data of predesignated data types. For example, the data acquisition component may then query the one or more databases for data associated with the period of time. The one or more databases may include the user registry indicating data associated with the electronic devices at issue and/or one or more data stores that include data indicating historical usage of the electronic devices. The data types of the data to be queried may include, for example, speaker identification data, authentication data, intent data, device-connectivity data, and/or data types determined to impact the confidence of detecting presence and/or authentication by a machine-learning model. For example, the speaker identification data may indicate the successful or failed speaker identification processes performed in association with audio data from the devices at issue. The authentication data may indicate authentication of one or more subjects in association with the devices at issue. The intent data may indicate intents associated with one or more user utterances received at the devices at issue. The device-connectivity data may indicate one or more accessory devices, such as personal devices associated with a given user profile, communicatively coupled to the devices at issue. It should be understood that while several example data types are provided herein, those data types are provided by way of illustration only and not as a limitation. This disclosure includes additional data types that may indicate and/or inform the presence of a subject and/or the authentication of the subject.

At block 414, the process 400 may include formatting the data. For example, a formatting component may receive labeling data, which may label the acquired data as positively or negatively associated with the speaker identification event, and/or the acquired data and may generate formatted data. The formatted data may be formatted for input into the one or more models utilized to detect presence and/or authentication events. For example, formatting of the data may include generating one or more features and/or feature vectors for the data, where the features and/or feature vectors represent input types that the models have been trained to utilize. The features may be individual measurable properties and/or characteristics of an observed outcome the model(s) have been trained to determine. The features may be numeric and/or may include one or more strings and/or graphs. In examples, the features may correspond to an explanatory variable, such as when statistical techniques are utilized when generating and/or utilizing models. The features may be utilized as inputs by the models to predict the designated outcome, as described herein.

At block 416, the process 400 may include utilizing the formatted data for model training and/or testing. The models may be configured to utilize the formatted data for training and/or testing purposes. For example, a given data set may be separated into data utilized for training and data utilized for testing. Training of the models may include, for example, selecting a training population of the data on which to train the model(s). Selection of the training population may include selecting data associated with a group of user accounts and/or devices and/or selecting data associated with a given period of time. Features associated with the data may be identified and/or selected and may be utilized as inputs to the model(s). Training of models may also include and/or be described herein as model fitting. Model fitting may be based at least in part on historical data. For example, once an event is selected, historical data indicating what data and/or data types may be relevant to predicting the event may be utilized. The models may be modified and/or otherwise configured, based at least in part on the historical data, to utilize the data and/or data types relevant to the event to predict the event. Model fitting may include techniques such as linear regression and/or nonlinear regression.

At block 418, the process 400 may include generating, utilizing the model, data indicating detection of a speaker identification event. For example, the process 400 may include inputting data indicating an environmental change associated with the first electronic device into the model trained as discussed above. For example, data may be generated by the first electronic device, or another device, indicating one or more environmental changes. The environmental changes may be detected by one or more sensors of the device, such as one or more microphones, cameras, electronic device beacons, GPS components, etc. That data may be received and formatted for input into the machine-learning model. The model, having been trained and/or tested as discussed herein, may utilize the data representing the environmental change to determine if the first data indicates presence of a subject and/or one or more other outputs that the machine-learning model is configured to determine. The model may also determine a confidence value associated with detection of the determined output. In examples, the confidence value may indicate more confidence than the model would have determined absent training and/or testing as described herein.

Once model training and/or testing has been performed, the machine-learning models may identify one or more data types that indicate presence and/or that may be utilized to authenticate a user profile. In these example, the system may receive data of the data type from the one or more devices associated with the account data. For example, data may be generated by the first electronic device, or another device, indicating one or more environmental changes, such as detection of the second wireless signal, speaker identification data, intent data, etc. The environmental changes may be detected by one or more sensors of the device, such as one or more microphones, cameras, electronic device beacons, GPS components, etc. That data may be received and formatted for input into the machine-learning model. The model may determine a similarity between the sample data and the data previously identified as being indicative of the outcome at issue, such as detection of presence. For example, comparisons between data having the data type(s) determined utilizing the ground truthing processes described above may be performed. When sample data corresponds to data determined to indicate presence and/or authentication, for example, then a similarity may be determined and utilized. In these example, the system may determine that a second speaker identification event has occurred from the similarity. For example, the machine-learning model, having been trained and/or tested as discussed herein, may utilize the data representing the environmental change to determine if the data indicates presence of a subject and/or one or more other outputs that the machine-learning model is configured to determine. The machine-learning model may also determine a confidence value associated with detection of the determined output. In examples, the confidence value may indicate more confidence than the machine-learning model would have determined absent training and/or testing as described herein.

Figure 5:
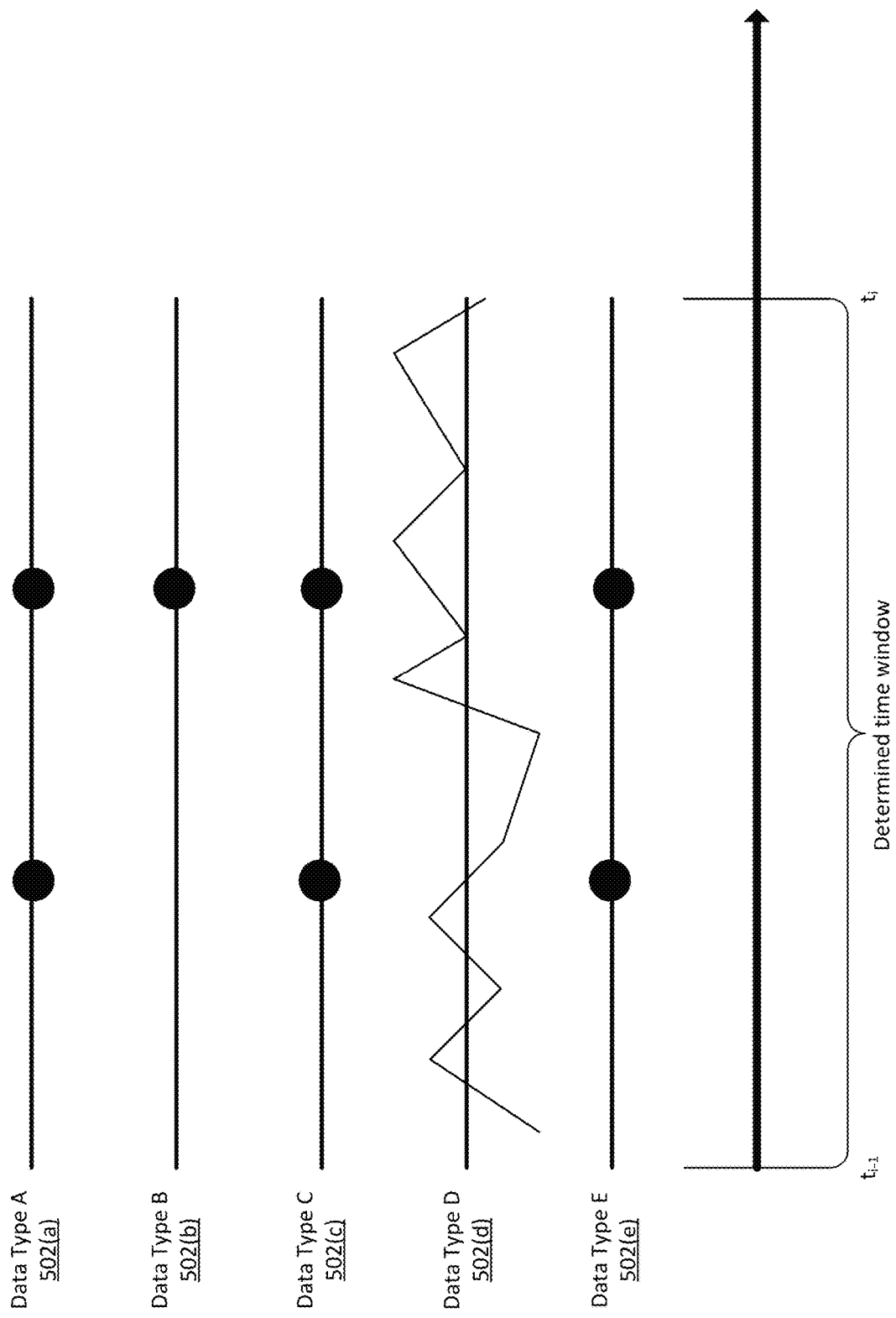
FIG. 5 illustrates a conceptual diagram of a timeline for presence ground truth approximation and utilization.

FIG. 5 illustrates a conceptual diagram of a timeline for presence ground truth approximation and utilization. The timeline shows, from left to right, the passage of time associated with the use of one or more electronic devices.

When a speaker identification event and/or authentication event is determined as outlined herein, a time stamp associated with that speaker identification event and/or authentication event may be generated. The time associated with the timestamp is labeled as $t_i$ in FIG. 5. A time window for acquiring associated data may be determined from $t_i$ to $t_{i-1}$. For example, the data acquisition component may determine a period of time prior to the speaker identification event and/or the authentication event to associate with the event. The period of time may be static and may be, for example, 1 minute, 2 minutes, 3 minutes, 5 minutes, or longer from the time of the event. In other examples, the period of time may be dynamic and may be based at least in part on the electronic devices at issue, the account data, the user profile, the confidence value associated with the detection of the event, historically-utilized periods of time, and/or output of machine-learning models trained to determine viability of data for approximating presence ground truths.

Once the period of time is determined, a data acquisition component may query one or more databases for data associated with one or more data types, such as Data Types A-E (a)-(e). The data may be associated with one or more events that occurred during the period of time. Using FIG. 5 as an example, two events, $Event_{i-1}$ and $Event_{i-n}$ may have occurred. The events may include the detection of a wake word, the generation of audio data, responding to a user utterance, etc. Data may be generated when these events occur, and that data may be stored in a datastore associated with the device involved in the event. It should be understood that while five data types are illustrated with respect to FIG. 5, one, two, three, four, five, or more than five data types may be utilized. The data types of the data to be queried may include, for example, speaker identification data, authentication data, intent data, device-connectivity data, and/or data types determined to impact the confidence of detecting presence and/or authentication by a machine-learning model. For example, the speaker identification data may indicate the successful or failed speaker identification processes performed in association with audio data from the devices at issue. The authentication data may indicate authentication of one or more subjects in association with the devices at issue. The intent data may indicate intents associated with one or more user utterances received at the devices at issue. The device-connectivity data may indicate one or more accessory devices, such as personal devices associated with a given user profile, communicatively coupled to the devices at issue. It should be understood that while several example data types are provided herein, those data types are provided by way of illustration only and not as a limitation. This disclosure includes additional data types that may indicate and/or inform the presence of a subject and/or the authentication of the subject. As shown in FIG. 5, data for all of the data types may not be available for each event. For example, while speaker identification data, intent data, and/or device-connectivity data may be available, authentication data may not be available, such as in circumstances where authentication processes were not performed. This data may be labelled, formatted, and utilized for model training and/or testing as described herein.

Once model training and/or testing has been performed, the machine-learning models may identify one or more data types that indicate presence and/or that may be utilized to authenticate a user profile. In these example, the system may receive data of the data type from the one or more devices associated with the account data. For example, data may be generated by the first electronic device, or another device, indicating one or more environmental changes, such as detection of the second wireless signal, speaker identification data, intent data, etc. The environmental changes may be detected by one or more sensors of the device, such as one or more microphones, cameras, electronic device beacons, GPS components, etc. That data may be received and formatted for input into the machine-learning model. The model may determine a similarity between the sample data and the data previously identified as being indicative of the outcome at issue, such as detection of presence. For example, comparisons between data having the data type(s) determined utilizing the ground truthing processes described above may be performed. When sample data corresponds to data determined to indicate presence and/or authentication, for example, then a similarity may be determined and utilized. In these example, the system may determine that a second speaker identification event has occurred from the similarity. For example, the machine-learning model, having been trained and/or tested as discussed herein, may utilize the data representing the environmental change to determine if the data indicates presence of a subject and/or one or more other outputs that the machine-learning model is configured to determine. The machine-learning model may also determine a confidence value associated with detection of the determined output. In examples, the confidence value may indicate more confidence than the machine-learning model would have determined absent training and/or testing as described herein.

Figure 6:
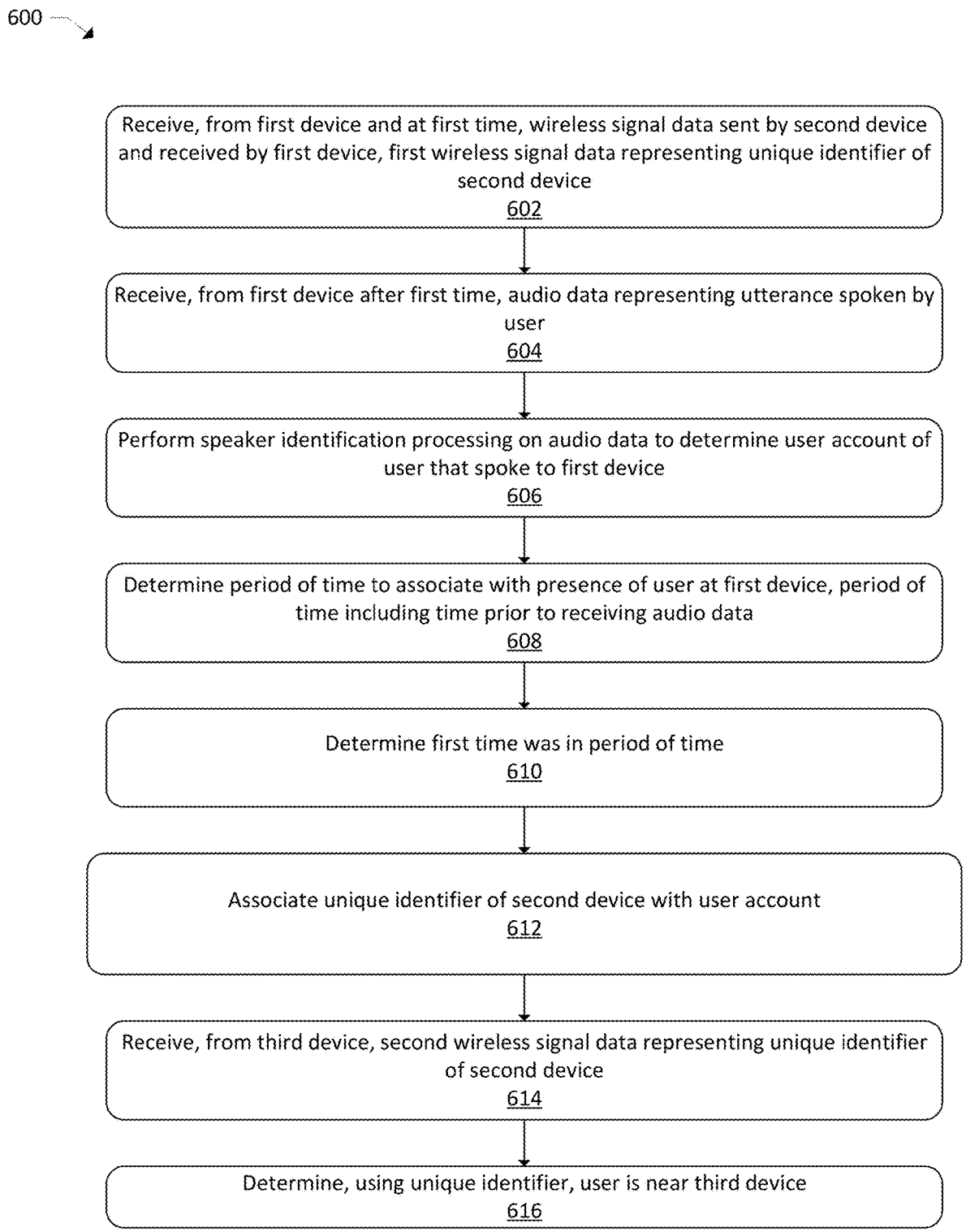
FIG. 6 illustrates a flow diagram of an example process for presence ground truth approximation and utilization.
Figure 7:
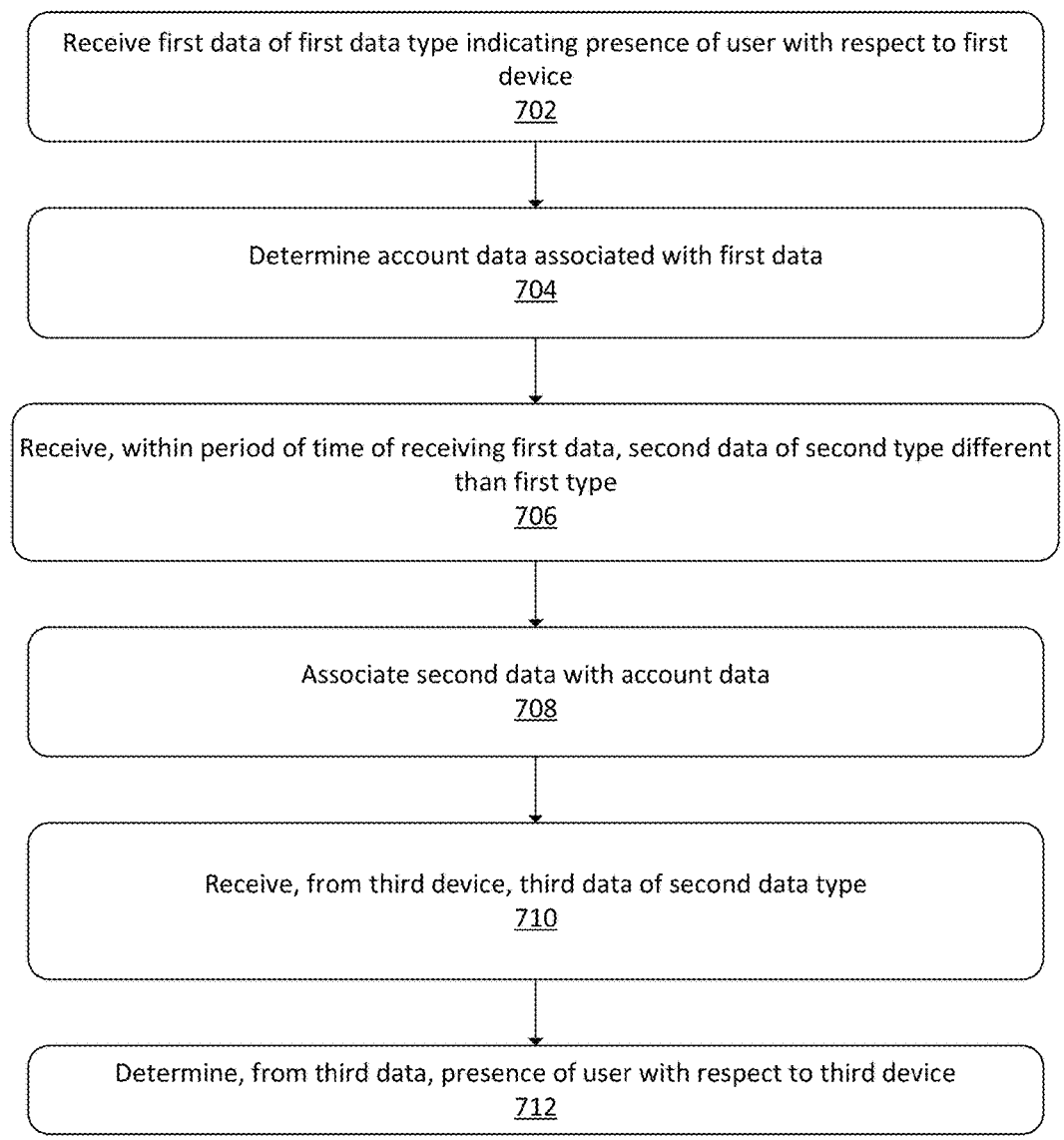
FIG. 7 illustrates a flow diagram of another example process for presence ground truth approximation and utilization.

FIGS. 6 and 7 illustrate processes for presence ground truth approximation and utilization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, 8, and 9), although the processes may be implemented in a wide variety of other environments, architectures and systems.

FIG. 6 illustrates a flow diagram of an example process 600 for presence ground truth approximation and utilization. The order in which the operations or steps are described is not intended to be construed as a limitation, and any number of the described operations may be combined in any order and/or in parallel to implement process 600.

At block 602, the process 600 may include receiving, from a first device and at a first time, wireless signal data sent by a second device and received by the first device, the first wireless signal data representing a unique identifier of the second device. The wireless signal data may include, for example, a Bluetooth (or other short-range connection) signal.

At block 604, the process 600 may include receiving, from the first device after the first time, audio data representing an utterance spoken by a user. For example, a microphone of the first device may capture audio corresponding to the utterance and may generate and send corresponding audio data to the remote system.

At block 606, the process 600 may include performing speaker identification processing on the audio data to determine a user account of the user that spoke to the first device. For example, a user may speak a user utterance and microphones of the electronic device may capture that audio and generate corresponding audio data. The audio data may be utilized by the electronic device and/or the remote system to perform speaker identification processes. For example, a given user profile may include one or more reference audio signatures that may be distinctive to the user associated with the user profile. A speaker identification component may be utilized to analyze a sample audio signature from the audio data in association with the reference audio signatures to determine whether the sample audio signature corresponds to at least one of the reference audio signatures and a confidence value associated with such a determination. For example, a device identifier associated with the electronic device from which the audio data was generated may be utilized to determine account data associated with the electronic device. The account data may be utilized to determine one or more user profiles associated with the account data. The user profiles may be queried for the reference audio signatures and a candidate set of reference audio signatures may be identified. The speaker identification component may then analyze the candidate set of reference audio signatures against the sample audio signature from the audio data to determine a confidence value associated with how closely the sample audio signature corresponds to each or some of the reference audio signatures. The reference audio signature with the most favorable confidence value may be selected and may indicate which user profile the audio data is associated with.

In other examples, the electronic device may "wake" and perform processes associated with the user utterance in situations where the electronic device detects a wake word from the audio data. For example, audio representing the user utterance may be received at the microphones of the electronic device and corresponding audio data may be generated. A digital signal processor of the electronic device may analyze the audio data in association with reference audio signatures to determine whether the audio data includes the wake word. In examples, a given environment may include multiple electronic devices that operate utilizing wake word functionality. In these examples, some or all of the electronic devices may detect the wake word from the same user utterance. An indication of which electronic devices detected the wake word may be sent to the remote system, and in examples the audio data representing the user utterance may be sent to the remote system from the electronic devices that detected the wake word.

In still other examples, one or more user profile authentication processes may be performed when a user interacts with the electronic devices. For example, when a user requests performance of an action utilizing the electronic device, some of those actions may involve one or more applications that may be utilized to perform the actions. In some examples, the application and/or the remote system may not impose authentication criteria on the use of such applications, such as in situations where the requested action does not involve sensitive information and/or is not user profile specific. In other examples, a given application and/or the remote system may impose authentication criteria. Examples of authentication criteria may include determining an identity of the user making the user utterance, such as through audio data analysis, image data analysis, biometric analysis, device-association analysis, etc. An example scenario where authentication criteria may be utilized includes when a user requests information associated with a bank account and/or health-related appointments. In these examples, the audio data corresponding to the request may be sent to the remote system, which may perform speech processing to determine intent data indicating that an application associated with the request, here a banking or health application, is to be utilized to provide a response. Based on the type of application and/or data associated with the application, authentication processes may be performed to determine whether the audio data, image data, etc. associated with the user corresponds to reference data associated with a user profile of the user. If the authentication processing succeeds, the application may be utilized to provide a response to the user, such as outputting audio indicating a bank account balance and/or providing information on a health-related appointment.

At block 608, the process 600 may include determining a period of time to associate with presence of the user at the first device, the period of time including time prior to receiving the audio data. For example, a data acquisition component may determine a period of time prior to the speaker identification event and/or the authentication event to associate with the event. The period of time may be static and may be, for example, 1 minute, 2 minutes, 3 minutes, 5 minutes, or longer from the time of the event. In other examples, the period of time may be dynamic and may be based at least in part on the electronic devices at issue, the account data, the user profile, the confidence value associated with the detection of the event, historically-utilized periods of time, and/or output of machine-learning models trained to determine viability of data for approximating presence ground truths.

At block 610, the process 600 may include determining the first time was in the period of time. For example, time stamps associated with the speaker identification processing may be generated and compared to the period of time to determine if the first time was in the period of time.

At block 612, the process 600 may include associating the unique identifier of the second device with the user account. For example, the user account may be caused to include the unique identifier and/or an indication that the unique identifier may be utilized for presence detection and/or user authentication.

At block 614, the process 600 may include receiving, from a third device, second wireless signal data representing the unique identifier of the second device. For example, the second device may be in proximity to the third device and may have sent wireless signal data to the third device.

At block 616, the process 600 may include determining, using the unique identifier, the user is near the third device. For example, having the unique identifier of the second device indicated in the user account to be associated with the second device, when the wireless signal data from the second device is received by the third device, the system may determine that the user associated with the second device is near the third device.

The process 600 may also include querying, utilizing the account data, a database for first wireless signal data associated with one or more devices associated with the account data for the period of time. For example, a data acquisition component may query the one or more databases for data associated with the period of time. The one or more databases may include the user registry indicating data associated with the electronic devices at issue and/or one or more data stores that include data indicating historical usage of the electronic devices. The data types of the data to be queried may include, for example, speaker identification data, authentication data, intent data, device-connectivity data, and/or data types determined to impact the confidence of detecting presence and/or authentication by a machine-learning model. For example, the speaker identification data may indicate the successful or failed speaker identification processes performed in association with audio data from the devices at issue. The authentication data may indicate authentication of one or more subjects in association with the devices at issue. The intent data may indicate intents associated with one or more user utterances received at the devices at issue. The device-connectivity data may indicate one or more accessory devices, such as personal devices associated with a given user profile, communicatively coupled to the devices at issue. It should be understood that while several example data types are provided herein, those data types are provided by way of illustration only and not as a limitation. This disclosure includes additional data types that may indicate and/or inform the presence of a subject and/or the authentication of the subject.

The process 600 may also include generating labeling data for the second data, the labeling data indicating that the second data is associated with the event. For example, a labeling component may receive the acquired data from the data acquisition component and may be configured to generate labeling data to associate with the acquired data. For example, the labeling data may include an indication that the acquired data is associated with the speaker identification event and/or authentication event and is to be utilized for training and/or testing one or more models configured to detect presence and/or to authenticate user profiles. In examples where the speaker identification processes and/or the authentication processes are utilized as described above, the labeling component may positively label the acquired data for utilization in model training and/or testing. In examples where the wake-word detection processes are utilized, the data associated with devices that detected the wake word may be positively labeled and some or all of the data associated with devices that did not detect the wake word may be negatively labeled. By so doing, the system may utilize the labeling component to determine which data should be associated with an approximated ground truth that presence has been detected and which data should be associated with an approximated ground truth that presence has not been detected. For example, in a given time window of 5 minutes, a first electronic device may receive multiple user utterances. In examples where the speaker identification event and/or authentication event is detected for that first electronic device, data associated with the multiple user utterances may be positively labeled for model training and/or testing. A second electronic device associated with the first electronic device may not have detected a wake word for the last user utterance but may have also received user utterances during the 5-minute time window. In these examples, data associated with the other user utterances may be negatively labeled as not corresponding to the presence and/or authentication event and may be utilized for model training and/or testing.

The process 600 may also include generating, in response to the labeling data indicating that the second data is associated with the event, formatted data from the second data, the formatted data formatted for input into a machine-learning model configured to determine presence of subjects. For example, a formatting component may receive labeling data, which may label the acquired data as positively or negatively associated with the speaker identification event, and/or the acquired data and may generate formatted data. The formatted data may be formatted for input into the one or more models utilized to detect presence and/or authentication events. For example, formatting of the data may include generating one or more features and/or feature vectors for the data, where the features and/or feature vectors represent input types that the models have been trained to utilize. The features may be individual measurable properties and/or characteristics of an observed outcome the model(s) have been trained to determine. The features may be numeric and/or may include one or more strings and/or graphs. In examples, the features may correspond to an explanatory variable, such as when statistical techniques are utilized when generating and/or utilizing models. The features may be utilized as inputs by the models to predict the designated outcome, as described herein.

The process 600 may also include inputting the formatted data into the machine-learning model, the formatted data configured to train the machine-learning model to more accurately detect presence. The models may be configured to utilize the formatted data for training and/or testing purposes. For example, a given data set may be separated into data utilized for training and data utilized for testing. Training of the models may include, for example, selecting a training population of the data on which to train the model(s). Selection of the training population may include selecting data associated with a group of user accounts and/or devices and/or selecting data associated with a given period of time. Features associated with the data may be identified and/or selected and may be utilized as inputs to the model(s). Training of models may also include and/or be described herein as model fitting. Model fitting may be based at least in part on historical data. For example, once an event is selected, historical data indicating what data and/or data types may be relevant to predicting the event may be utilized. The models may be modified and/or otherwise configured, based at least in part on the historical data, to utilize the data and/or data types relevant to the event to predict the event. Model fitting may include techniques such as linear regression and/or nonlinear regression.

The process 600 may also include receiving second wireless signal data from the one or more devices associated with the account data. For example, data may be generated by the first electronic device, or another device, indicating one or more environmental changes, such as detection of the second wireless signal. The environmental changes may be detected by one or more sensors of the device, such as one or more microphones, cameras, electronic device beacons, GPS components, etc. That data may be received and formatted for input into the machine-learning model. The process 600 may also include determining a similarity between the first wireless signal data and the second wireless signal data. For example, comparisons between data having the data type(s) determined utilizing the ground truthing processes described above may be performed. When sample data corresponds to data determined to indicate presence and/or authentication, for example, then a similarity may be determined and utilized. The process 600 may also include determining that a second speaker identification event has occurred from the similarity. For example, the machine-learning model, having been trained and/or tested as discussed herein, may utilize the data representing the environmental change to determine if the data indicates presence of a subject and/or one or more other outputs that the machine-learning model is configured to determine. The machine-learning model may also determine a confidence value associated with detection of the determined output. In examples, the confidence value may indicate more confidence than the machine-learning model would have determined absent training and/or testing as described herein.

Additionally, or alternatively, the process 600 may include determining, utilizing the audio data, speaker identification data associated with the audio data. The process 600 may also include determining a confidence score associated with the speaker identification data and determining that the confidence score satisfies a threshold confidence score. The process 600 may also include determining that the audio data indicates that the first speaker identification event has been occurred in response to the confidence score satisfying the threshold confidence score.

Additionally, or alternatively, the process 600 may include receiving, from the first electronic device, data indicating that a wake word was detected by the first electronic device. The process 600 may also include determining, utilizing the account data, that a second electronic device is associated with the account data and determining that the wake word was not detected by the second electronic device. The process 600 may also include querying, utilizing the account data, the database for data associated with the second electronic device for the period of time. The process 600 may also include determining that instances of wireless signal data associated with the second electronic device are unassociated with the speaker identification event.

Additionally, or alternatively, the process 600 may include receiving request data for utilizing an application in association with the first electronic device, the application having a user-authentication restriction. The process 600 may also include determining that an authentication criteria for utilizing the application has been satisfied. The process 600 may also include determining that the audio data indicates that the speaker identification event has been determined in response to the authentication criteria being satisfied.

FIG. 7 illustrates a flow diagram of another example process 700 for presence ground truth approximation and utilization. The order in which the operations or steps are described is not intended to be construed as a limitation, and any number of the described operations may be combined in any order and/or in parallel to implement process 700.

At block 702, the process 700 may include receiving first data of a first data type indicating presence of a user with respect to a first device. For example, a user may speak a user utterance and microphones of the electronic device may capture that audio and generate corresponding audio data. The audio data may be utilized by the electronic device and/or the remote system to perform speaker identification processes. For example, a given user profile may include one or more reference audio signatures that may be distinctive to the user associated with the user profile. A speaker identification component may be utilized to analyze a sample audio signature from the audio data in association with the reference audio signatures to determine whether the sample audio signature corresponds to at least one of the reference audio signatures and a confidence value associated with such a determination. For example, a device identifier associated with the electronic device from which the audio data was generated may be utilized to determine account data associated with the electronic device. The account data may be utilized to determine one or more user profiles associated with the account data. The user profiles may be queried for the reference audio signatures and a candidate set of reference audio signatures may be identified. The speaker identification component may then analyze the candidate set of reference audio signatures against the sample audio signature from the audio data to determine a confidence value associated with how closely the sample audio signature corresponds to each or some of the reference audio signatures. The reference audio signature with the most favorable confidence value may be selected and may indicate which user profile the audio data is associated with.

In other examples, the electronic device may "wake" and perform processes associated with the user utterance in situations where the electronic device detects a wake word from the audio data. For example, audio representing the user utterance may be received at the microphones of the electronic device and corresponding audio data may be generated. A digital signal processor of the electronic device may analyze the audio data in association with reference audio signatures to determine whether the audio data includes the wake word. In examples, a given environment may include multiple electronic devices that operate utilizing wake word functionality. In these examples, some or all of the electronic devices may detect the wake word from the same user utterance. An indication of which electronic devices detected the wake word may be sent to the remote system, and in examples the audio data representing the user utterance may be sent to the remote system from the electronic devices that detected the wake word.

In still other examples, one or more user profile authentication processes may be performed when a user interacts with the electronic devices. For example, when a user requests performance of an action utilizing the electronic device, some of those actions may involve one or more applications that may be utilized to perform the actions. In some examples, the application and/or the remote system may not impose authentication criteria on the use of such applications, such as in situations where the requested action does not involve sensitive information and/or is not user profile specific. In other examples, a given application and/or the remote system may impose authentication criteria. Examples of authentication criteria may include determining an identity of the user making the user utterance, such as through audio data analysis, image data analysis, biometric analysis, device-association analysis, etc. An example scenario where authentication criteria may be utilized includes when a user requests information associated with a bank account and/or health-related appointments. In these examples, the audio data corresponding to the request may be sent to the remote system, which may perform speech processing to determine intent data indicating that an application associated with the request, here a banking or health application, is to be utilized to provide a response. Based on the type of application and/or data associated with the application, authentication processes may be performed to determine whether the audio data, image data, etc. associated with the user corresponds to reference data associated with a user profile of the user. If the authentication processing succeeds, the application may be utilized to provide a response to the user, such as outputting audio indicating a bank account balance and/or providing information on a health-related appointment.

At block 704, the process 700 may include determining account data associated with the first data. For example, the first data may be associated with a given user account and the first data may be utilized to determine which account data is associated with the first data.

At block 706, the process 700 may include receiving, within a period of time of receiving the first data, second data of a second type different than the first type. For example, the data acquisition component may then query the one or more databases for data associated with the period of time. The one or more databases may include the user registry indicating data associated with the electronic devices at issue and/or one or more data stores that include data indicating historical usage of the electronic devices. The data types of the data to be queried may include, for example, speaker identification data, authentication data, intent data, device-connectivity data, and/or data types determined to impact the confidence of detecting presence and/or authentication by a machine-learning model. For example, the speaker identification data may indicate the successful or failed speaker identification processes performed in association with audio data from the devices at issue. The authentication data may indicate authentication of one or more subjects in association with the devices at issue. The intent data may indicate intents associated with one or more user utterances received at the devices at issue. The device-connectivity data may indicate one or more accessory devices, such as personal devices associated with a given user profile, communicatively coupled to the devices at issue. It should be understood that while several example data types are provided herein, those data types are provided by way of illustration only and not as a limitation. This disclosure includes additional data types that may indicate and/or inform the presence of a subject and/or the authentication of the subject.

At block 708, the process 700 may include associating the second data with the account data. For example, a labeling component may receive the acquired data from the data acquisition component and may be configured to generate labeling data to associate with the acquired data. For example, the labeling data may include an indication that the acquired data is associated with the speaker identification event and/or authentication event and is to be utilized for training and/or testing one or more models configured to detect presence and/or to authenticate user profiles. In examples where the speaker identification processes and/or the authentication processes are utilized as described above, the labeling component may positively label the acquired data for utilization in model training and/or testing. In examples where the wake-word detection processes are utilized, the data associated with devices that detected the wake word may be positively labeled and some or all of the data associated with devices that did not detect the wake word may be negatively labeled. By so doing, the system may utilize the labeling component to determine which data should be associated with an approximated ground truth that presence has been detected and which data should be associated with an approximated ground truth that presence has not been detected. For example, in a given time window of 5 minutes, a first electronic device may receive multiple user utterances. In examples where the speaker identification event and/or authentication event is detected for that first electronic device, data associated with the multiple user utterances may be positively labeled for model training and/or testing. A second electronic device associated with the first electronic device may not have detected a wake word for the last user utterance but may have also received user utterances during the 5-minute time window. In these examples, data associated with the other user utterances may be negatively labeled as not corresponding to the presence and/or authentication event and may be utilized for model training and/or testing.

At block 710, the process 700 may include receiving, from a third device, third data of the second data type. For example, the third device may receive the third data from a user and/or a device and that third data may be of the second data type, such as speaker identification data, authentication data, intent data, wireless signal data, etc.

At block 712, the process 700 may include determining, from the third data, presence of a user with respect to third device. For example, having the second data type indicated in the user account to be associated with a given device or user, when the second data type is received by the third device, the system may determine that the user associated with the device associated with the data type is near the third device.

The process 700 may also include generating formatted data from the second data, the formatted data formatted for input into a model configured to determine at least one of presence of subjects or authentication of subject identity. For example, a formatting component may receive labeling data, which may label the acquired data as positively or negatively associated with the speaker identification event, and/or the acquired data and may generate formatted data. The formatted data may be formatted for input into the one or more models utilized to detect presence and/or authentication events. For example, formatting of the data may include generating one or more features and/or feature vectors for the data, where the features and/or feature vectors represent input types that the models have been trained to utilize. The features may be individual measurable properties and/or characteristics of an observed outcome the model(s) have been trained to determine. The features may be numeric and/or may include one or more strings and/or graphs. In examples, the features may correspond to an explanatory variable, such as when statistical techniques are utilized when generating and/or utilizing models. The features may be utilized as inputs by the models to predict the designated outcome, as described herein.

The process 700 may also include inputting the formatted data into the model. The models may be configured to utilize the formatted data for training and/or testing purposes. For example, a given data set may be separated into data utilized for training and data utilized for testing. Training of the models may include, for example, selecting a training population of the data on which to train the model(s). Selection of the training population may include selecting data associated with a group of user accounts and/or devices and/or selecting data associated with a given period of time. Features associated with the data may be identified and/or selected and may be utilized as inputs to the model(s). Training of models may also include and/or be described herein as model fitting. Model fitting may be based at least in part on historical data. For example, once an event is selected, historical data indicating what data and/or data types may be relevant to predicting the event may be utilized. The models may be modified and/or otherwise configured, based at least in part on the historical data, to utilize the data and/or data types relevant to the event to predict the event. Model fitting may include techniques such as linear regression and/or nonlinear regression.

The process 700 may also include determining that a second instance of the event has occurred based at least in part on a similarity between the third data and the second data. For example, the model, having been trained and/or tested as discussed herein, may utilize the data representing the environmental change to determine if the data indicates presence of a subject and/or one or more other outputs that the machine-learning model is configured to determine. The model may also determine a confidence value associated with detection of the determined output. In examples, the confidence value may indicate more confidence than the model would have determined absent training and/or testing as described herein.

Additionally, or alternatively, the process 700 may include determining, based at least in part on the audio data, speaker identification data associated with the audio data. The process 700 may also include determining a confidence score associated with the speaker identification and determining that the confidence score satisfies a threshold confidence score. The process 700 may also include determining that the first data indicates that the first instance of the event has occurred based at least in part on the confidence score satisfying the threshold confidence score.

Additionally, or alternatively, the process 700 may include receiving, from the first electronic device, data indicating that a wake word was detected by the first electronic device. The process 700 may also include determining, based at least in part on the account data, that a second electronic device is associated with the account data. The process 700 may also include determining that the wake word was not detected by the second electronic device. The process 700 may also include querying, based at least in part on the account data, the database for data associated with the second electronic device for the period of time. The process 700 may also include determining that instances of data of the second data type associated with the second electronic device are unassociated with the event.

Additionally, or alternatively, the process 700 may include receiving request data for utilizing an application in association with the first electronic device. The process 700 may also include determining that an authentication criteria for utilizing the application has been satisfied. The process 700 may also include determining that the first data indicates that the event has been determined based at least in part on the authentication criteria being satisfied.

Additionally, or alternatively, the process 700 may include querying the database for the second data, wherein the second data may include at least one of: speaker identification data indicating a speaker identification performed in association with audio data from the first electronic device; authentication data indicating authentication of a subject in association with the first electronic device; intent data indicating an intent associated with a user utterance received at the first electronic device; or device data indicating an accessory device communicatively coupled to the first electronic device.

Additionally, or alternatively, the process 700 may include determining, based at least in part on the account data, that a second electronic device is associated with the account data. The process 700 may also include determining that the second electronic device detected the wake word at a time associated with detection of the wake word by the first electronic device. The process 700 may also include querying, based at least in part on the account data, the database for data associated with the second electronic device for the period of time and associating the data with the event.

Additionally, or alternatively, the process 700 may include sending request data to the first electronic device, the request data for feedback associated with the event. The process 700 may also include receiving response data confirming occurrence of the event. The process 700 may also include weighting the second data based at least in part on the response data confirming occurrence of the event.

Additionally, or alternatively, the process 700 may include determining, utilizing the machine-learning model, a data type determined by the machine-learning model to have an impact on a confidence score associated with determining the at least one of presence of the subjects or authentication of the subject identity. The process 700 may also include querying the database for data associated with the data type and associating the fourth data with the event.

Figure 8:
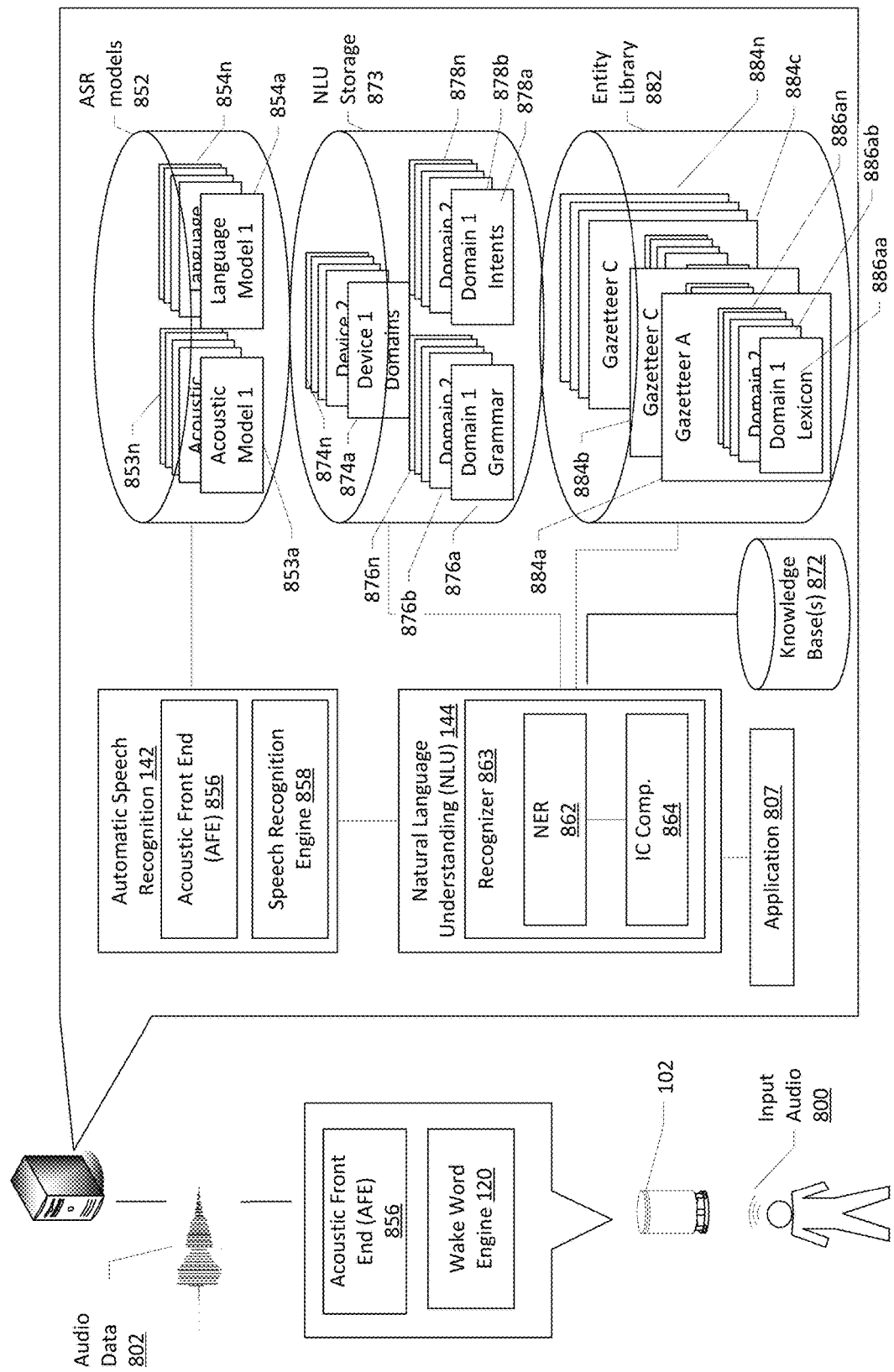
FIG. 8 illustrates a conceptual diagram of components of a speech-processing system for processing audio data provided by one or more devices.

FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 8 may occur directly or across a network 108. An audio capture component, such as a microphone 116 of the device 102, or another device, captures audio 800 corresponding to a spoken utterance. The device 102, using a wake word engine 120, then processes audio data corresponding to the audio 800 to determine if a keyword (such as a wakeword) is detected in the audio data. Following detection of a wakeword, the device 102 sends audio data 802 corresponding to the utterance to the remote system 106 that includes an ASR component 142. The audio data 802 may be output from an optional acoustic front end (AFE) 856 located on the device prior to transmission. In other instances, the audio data 802 may be in a different form for processing by a remote AFE 856, such as the AFE 856 located with the ASR component 142 of the remote system 106.

The wake word engine 120 works in conjunction with other components of the user device, for example a microphone to detect keywords in audio 800. For example, the device may convert audio 800 into audio data, and process the audio data with the wake word engine 120 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 120 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 802 corresponding to input audio 800 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 802 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 142 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 142 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the remote system 106 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, purchase Item A?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 858 may identify, determine, and/or generate text data corresponding to the user utterance, here "purchase Item A."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 144 (e.g., server 106) may include various components, including potentially dedicated processor(s), memory, storage, etc. As shown in FIG. 8, an NLU component 144 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 142 based on the utterance input audio 800) and attempts to make a semantic interpretation of the text. That is, the NLU process determines the meaning behind the text based on the individual words and then implements that meaning. NLU processing 144 interprets a text string to derive an intent or a desired action from the user as well as the pertinent pieces of information in the text that allow a device (e.g., device 102) to complete that action. For example, if a spoken utterance is processed using ASR 142 and outputs the text "purchase Item A" the NLU process may determine that the user intended to purchase "Item A" from a predesignated online marketplace.

The NLU may process several textual inputs related to the same utterance. For example, if the ASR 142 outputs N text segments (as part of an N-best list), the NLU may process all N outputs to obtain NLU results.

As will be discussed further below, the NLU process may be configured to parse and tag to annotate text as part of NLU processing. For example, for the text "purchase Item A," "purchase" may be tagged as a command (to initiate a payment transaction) and "Item A" may be tagged as the naming identifier of the item to be purchased.

To correctly perform NLU processing of speech input, an NLU process 144 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 144 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878a-878n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (876) framework or frameworks may correspond to sentence structures such as "purchase item called 'Item A' from Marketplace A."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song." meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 862 may search the database of generic words associated with the domain (in the knowledge base 872). So, for instance, if the query was "identify this song." after failing to determine which song is currently being output, the NER component 862 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to an application 807. The destination application 807 may be determined based on the NLU output. For example, if the NLU output includes a command to send a message, the destinated application 807 may be a message sending application, such as one located on the user device or in a message sending appliance, configured to execute a message sending command. If the NLU output includes a search request, the destination application 807 may include a search engine processor, such as one located on a search server, configured to execute a search command. After the appropriate command is generated based on the intent of the user, the application 807 may provide some or all of this information to a text-to-speech (TTS) engine. The TTS engine may then generate an actual audio file for outputting the audio data determined by the application 807 (e.g., "okay," or "purchase made"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 144 during runtime operations where NLU operations are performed on text (such as text output from an ASR component 142). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 9:
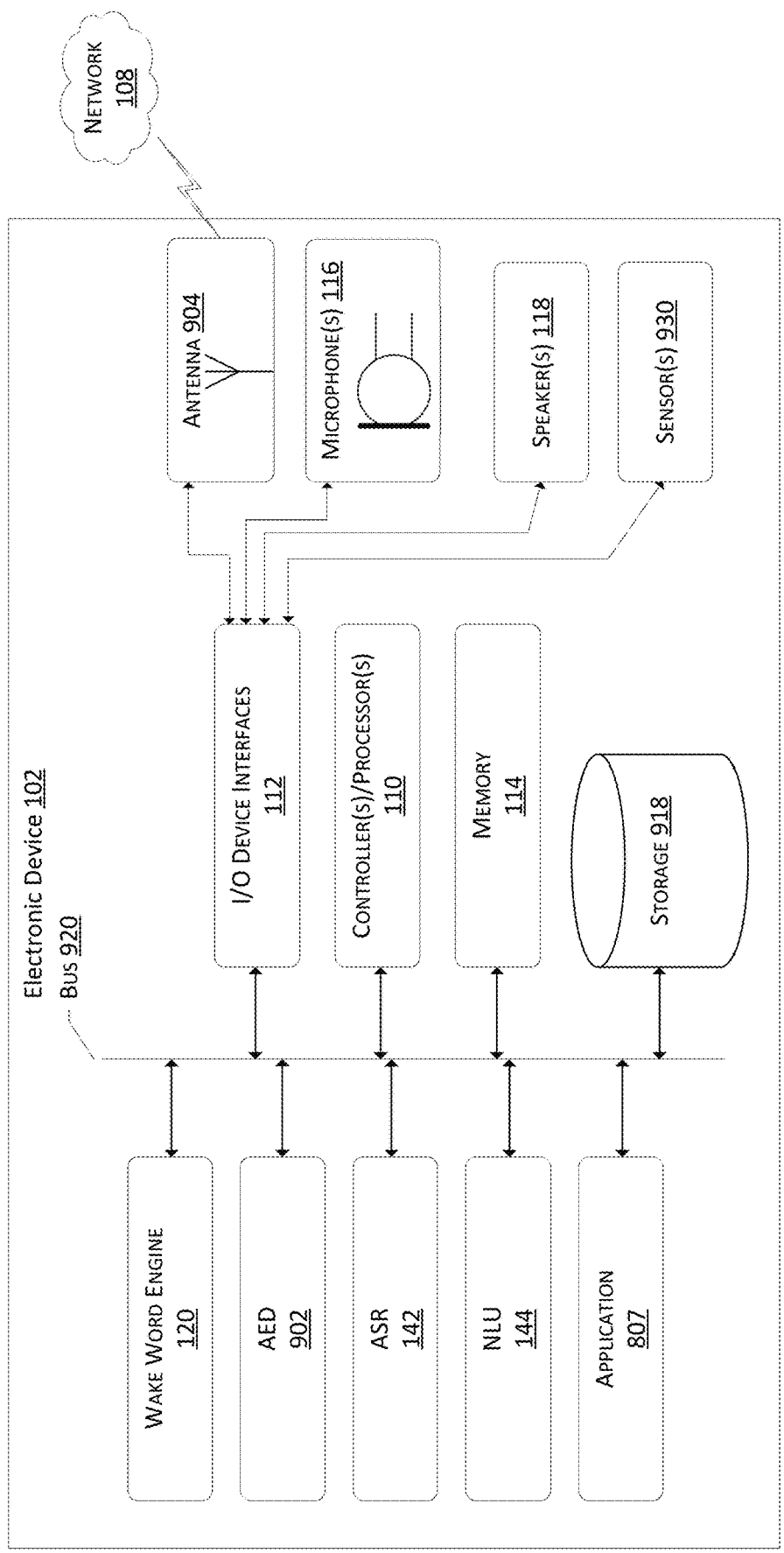
FIG. 9 illustrates a conceptual diagram of example components of an electronic device that may be utilized in association with presence ground truth approximation and utilization.

FIG. 9 illustrates a conceptual diagram of example components of an electronic device 102 that may be utilized in association with configurations for identifying aid providers during emergent situations. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 116, a power source, and functionality for sending generated audio data via one or more antennas 904 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 9 may include one or more controllers/processors 110, that may include a central processing unit (CPU) for processing data and computer-readable instructions, and memory 114 for storing data and instructions of the device 102. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 918, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 920 for conveying data among components of the respective device. Each component within a device 102 may also be directly connected to other components in addition to, or instead of, being connected to other components across the bus 920.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 110 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 801, ASR component 142, etc.) may be configured to generate audio data corresponding to captured audio. The device 102 (using input/output device interfaces 112, antenna 904, etc.) may also be configured to transmit the audio data to the remote system 106 for further processing or to process the data using internal components such as a wakeword detection component 801.

Via the antenna(s) 904, the input/output device interface 112 may connect to one or more networks 108 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 108, the speech-processing system may be distributed across a networked environment. Accordingly, the device 102 and/or the remote system 106 may include an ASR component 142. The ASR component 142 of device 102 may be of limited or extended capabilities. The ASR component 142 may include language models stored in ASR model storage component, and an ASR component 142 that performs automatic speech recognition. If limited speech recognition is included, the ASR component 142 may be configured to identify a limited number of words, such as keywords detected by the device, whereas extended speech recognition may be configured to recognize a much larger range of words.

The device 102 and/or the remote system 106 may include a limited or extended NLU component 144. The NLU component 144 of device 102 may be of limited or extended capabilities. The NLU component 144 may comprise a name entity recognition module, an intent classification module and/or other components. The NLU component 144 may also include a stored knowledge base and/or entity library, or those storages may be separately located.

In examples, AED 902 may also be performed by the device 102. In these examples, the operations may include causing the AED component 902 to be enabled or otherwise turned on, or the operations may include causing the AED component 902 to transition from a first mode to a second mode representing a higher sensitivity to audio data generated by the microphone 116. The AED component 902 may utilize the audio data generated by the microphone 116 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 902 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 902 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 106 may also include an application 807 that is configured to execute commands/functions associated with a spoken command as described herein. The device 102 may include a wake word engine 120, which may be a separate component or may be included in an ASR component 142. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 118 and may utilize speaker(s) of an external or peripheral device to output audio via the speaker(s) of the external/peripheral device.

To assist with presence detection and/or user profile authentication, for example, the device 102 may include one or more sensors 930 that may be configured to detect environmental changes indicative of user presence and/or user profile authentication. The sensors 930 may include, for example, radar, audio sensors such as the microphones 116, ultrasonic sensors, cameras, temperature sensors, motion sensors, light sensors, etc.

Figure 10:
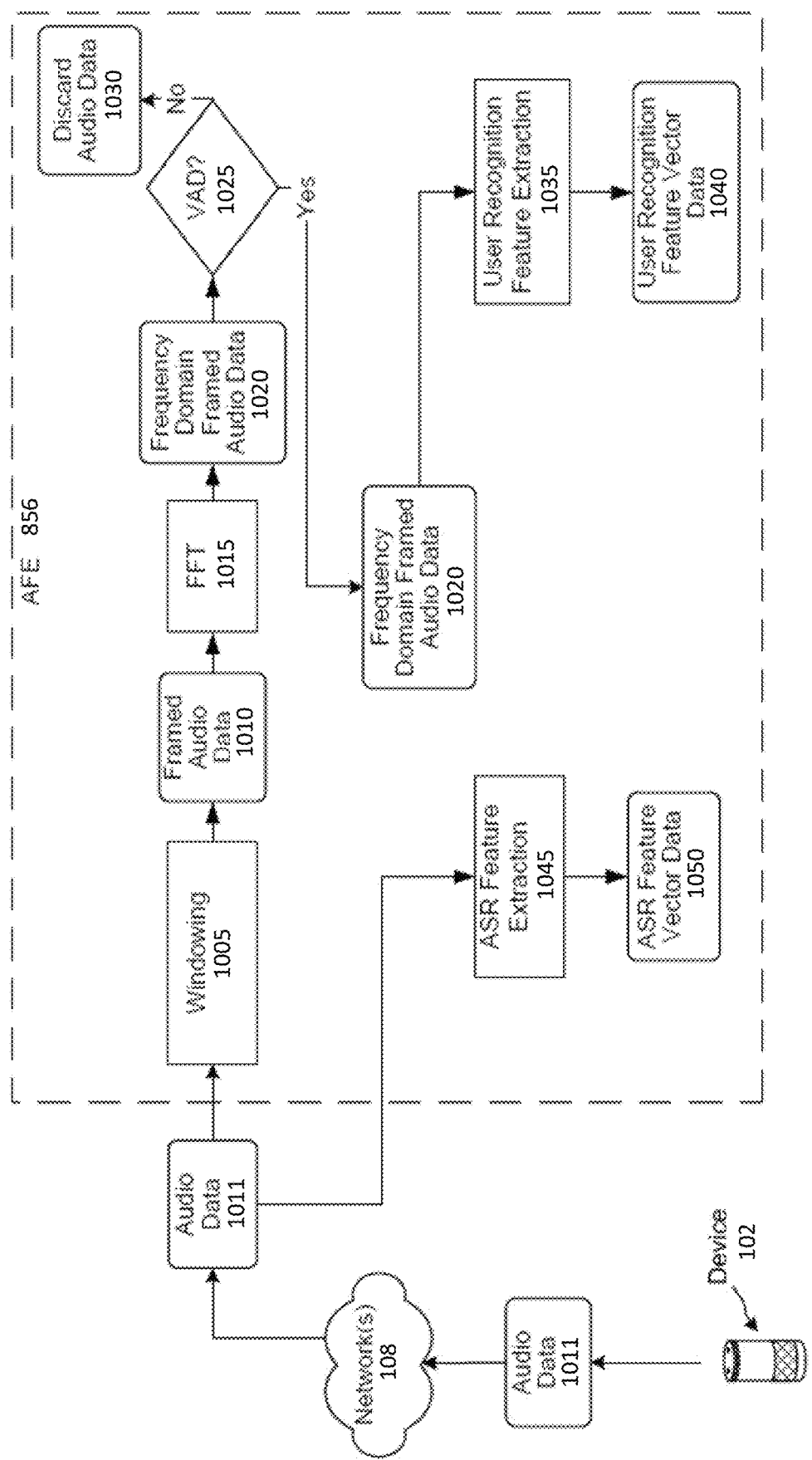
FIG. 10 is a flow diagram illustrating processing that may be performed to prepare audio data for ASR processing and user recognition processing according to embodiments of the present disclosure.

FIG. 10 illustrates processing that may be performed to prepare the audio data 1011 for ASR processing and user recognition processing. As described, the device 102 sends the audio data 1011 through a network(s) 108 to the system(s) for processing. The system(s) may include an acoustic front end (AFE) 856 (or other component(s)) that performs various functions on the audio data 1011 to prepare the audio data 1011 for further downstream processing, such as ASR processing and/or user recognition processing. For example, the AFE 856 may include a windowing component 1005 that performs windowing functions on the audio data 1011 to create framed audio data 1010 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 856 may include a fast Fourier transform (FFT) component 1015 configured to perform FFT to convert the waveforms in each frame of the framed audio data 1010 from its original domain (e.g., time) to a representation in a frequency domain (thereby creating frequency domain framed audio data 1020). Audio processing techniques other than or in addition to FFT may be used to transform audio data (e.g., waveforms) into data that can be processed as needed.

The AFE 956 may include a voice activity detection (VAD) component 1025 that determines whether voice activity (i.e., speech) is present in the post-FFT waveforms (i.e., frequency domain framed audio data 1020). In doing so, the system(s) may perform VAD operations discussed above. The VAD detector (or other component) may be configured in a different order, for example the VAD detector may operate on the audio data 1011 rather than on the frequency domain framed audio data 1020, may operate on ASR features, etc. Various different configurations of components are possible. If there is no speech in the frequency domain framed audio data 1020, the system(s) discards (1030) the frequency domain framed audio data 1005 (i.e., removes the audio data from the processing stream). If, instead, the system(s) detects speech in the frequency domain framed audio data 1020, the system(s) executes a user recognition feature extraction component 1035 with respect to the frequency domain framed audio data 1020.

The user recognition feature extraction component 1035 may perform frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature vector data 1040). The user recognition feature extraction component 1035 may continue to process until voice activity is no longer detected in the frequency domain framed audio data 1020, at which point the system(s) may determine that an endpoint of the speech has been reached.

An ASR feature extraction component 1045 may perform ASR feature extraction on all of the audio data 1011 received from the device 102. Alternatively (not illustrated), the ASR feature extraction component 1045 may only perform ASR feature extraction on audio data including speech (e.g., as indicated by the VAD component 1025). The ASR feature extraction component 1045 and/or the user recognition feature extraction component 1035 may determine values (i.e., features) representing qualities of the frequency domain framed audio data 1020, along with quantitating those features into values (i.e., feature vectors or audio feature vectors). The ASR feature extraction component 1045 may determine ASR feature vector data 1050 useful for ASR processing, and the user recognition feature extraction component 1035 may determine user recognition feature vector data 1040 (sometimes called an i-vector) useful for user recognition processing. The ASR feature vector data 1050 and the user recognition feature vector data 1040 may be the same feature vectors, different feature vectors, or may include some overlapping features. A number of approaches may be used to extract feature vectors from the frequency domain framed audio data 1020, such as MFCCs, PLP techniques, neural network feature vector techniques, linear discriminant analysis, semi-tied covariance matrices, or other approaches known to those skilled in the art.

The ASR feature vector data 1050 may include a different audio feature vector for each audio frame. Thus, for one 25 ms long audio frame, the ASR feature extraction component 1045 may output a single ASR feature vector. The ASR feature vector data 1050 may be input to the ASR component 142.

Depending on system configuration, the user recognition feature extraction component 1035 may output multiple user recognition feature vectors, for example one such vector for each audio frame. Alternatively, the user recognition feature extraction component 1035 may continue to input the frequency domain framed audio data 1020 while the utterance is ongoing (e.g., before the endpoint of the speech is reached in the audio data 1011). While the frequency domain framed audio data 1020 is input, the user recognition feature extraction component 1035 may accumulate or otherwise combine the frequency domain framed audio data 1020 as it comes in. That is, for a certain frame's worth of frequency domain framed audio data 1020 that comes in, the user recognition feature extraction component 1035 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 1035 may depend on what audio qualities are determined to be important for ultimate user recognition processing. Thus, the user recognition feature extraction component 1035 may be trained to isolate and process data that is most useful for user recognition processing. The output of the user recognition feature extraction component 1035 may thus include user recognition feature vector data 1040 that includes values for features useful for user recognition processing. The resulting user recognition feature vector data 1040 may be input to the user recognition engine 999.

The user recognition feature vector data 1040 may include multiple vectors each corresponding to different portions of a spoken user input. Alternatively, the user recognition feature vector data 1040 may be a single vector representing audio qualities of the spoken user input.

Figure 11:
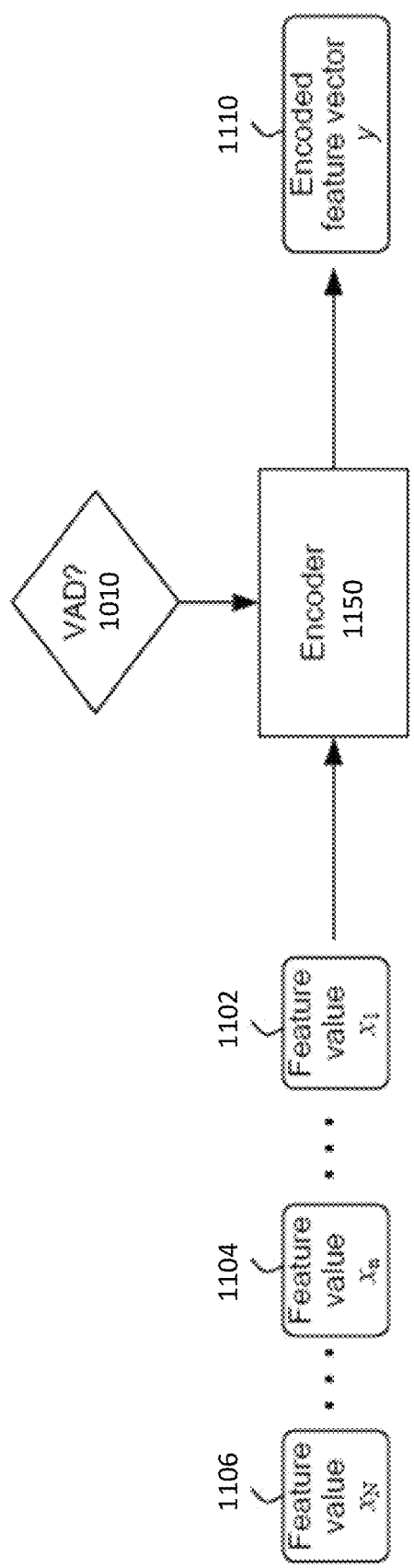
FIG. 11 is a diagram of a vector encoder according to embodiments of the present disclosure.

Referring to FIG. 11, the single vector may be created using an encoder 1150, which can create a fixed-size vector to represent certain characteristics of the audio data as described below. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. As shown in FIG. 11, feature values 1102 through 1106 (which may include feature vectors of the audio data 1011, the frequency domain framed audio data 1020, or the like) may be input into an encoder 1150, which will output an encoded feature vector 1110 that represents the input feature values. Output of the VAD component 1025 may be an input into the encoder 1150 such that the encoder 1150 may only operate when feature values input therein correspond to speech. The individual feature values (e.g., 1102-1106) may correspond to specific audio frames. Regardless of how many feature values are input, any particular encoder 1150 will be configured to output vectors of the same size, thus ensuring a continuity of output encoded vector size from any particular encoder 1150 (though different encoders may output vectors of different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 1150 may be implemented as a neural network (NN), recurrent neural network (RNN), GMM, or other model. One particular example is a long short-term memory (LSTM) RNN. There are a variety of ways for the encoder 1150 to consume data input therein, including but not limited to:

linear, one direction (forward or backward),
bi-linear, essentially the concatenation of a forward and a backward embedding, or
tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 11 illustrates operation of the encoder 1150. The input feature value sequence, starting with feature value $x_1$ 1102, continuing through feature value $x_n$ 1104, and concluding with feature value $x_N$ 1106 is input into the encoder 1150. The encoder 1150 may process the input feature values as noted above. The encoder 1150 outputs the encoded feature vector y 1110, which is a fixed length feature vector of length F. Thus, the user recognition feature extraction component 1035 may include an encoder 1150 that receives audio feature values for a particular spoken user input, and outputs a fixed length encoded feature vector y 1110, which may be the user recognition feature/vector data 1040. Thus, in certain system configurations, no matter how long the spoken user input is, or how many acoustic frames worth of feature values are input into the encoder 1150, the output feature vector 1110/1040 will be of the same length, thus allowing for more ease of performing user recognition processing by the user recognition engine 999. To allow for robust system operation, a final vector 1110/1040 may include many dimensions (e.g., several hundred), thus providing many datapoints for downstream consideration.

To determine the user recognition feature vector data 1040, the system(s) may (for example using the VAD component 1025) determine that voice activity is detected in input audio data. This may indicate the beginning of the spoken user input, thus resulting in the system(s) determining that the spoken user input starts at a first point in audio data. Audio processing (for example performed by the windowing component 1005, the FFT component 1015, the ASR feature extraction component 1045, the user recognition feature extraction component 1035, ASR processing, or the like) may continue on audio data starting at the first point and continuing until the VAD component 1025 determines that voice activity is no longer detected at a second point in audio data. Thus, the system(s) may determine that the spoken user input ends at the second point. Thus, the first point may be considered the beginpoint of the spoken user input and the second point may be considered the endpoint of the spoken user input. The VAD component 1025 may signal the user recognition feature extraction component 1035 when the beginpoint and/or endpoint is detected so that the user recognition feature extraction component 1035 may begin processing audio data starting at the beginpoint and ending at the endpoint. Further, audio frames during the spoken user input that do not include speech may be filtered out by the VAD component 1025 and thus not considered by the ASR feature extraction component 1045 and/or the user recognition feature extraction component 1035. The resulting accumulated/processed speech audio data (from beginpoint to endpoint) may then be represented in a single feature vector for the user recognition feature vector data 1040, which may then be used for user recognition processing.

Figure 12:
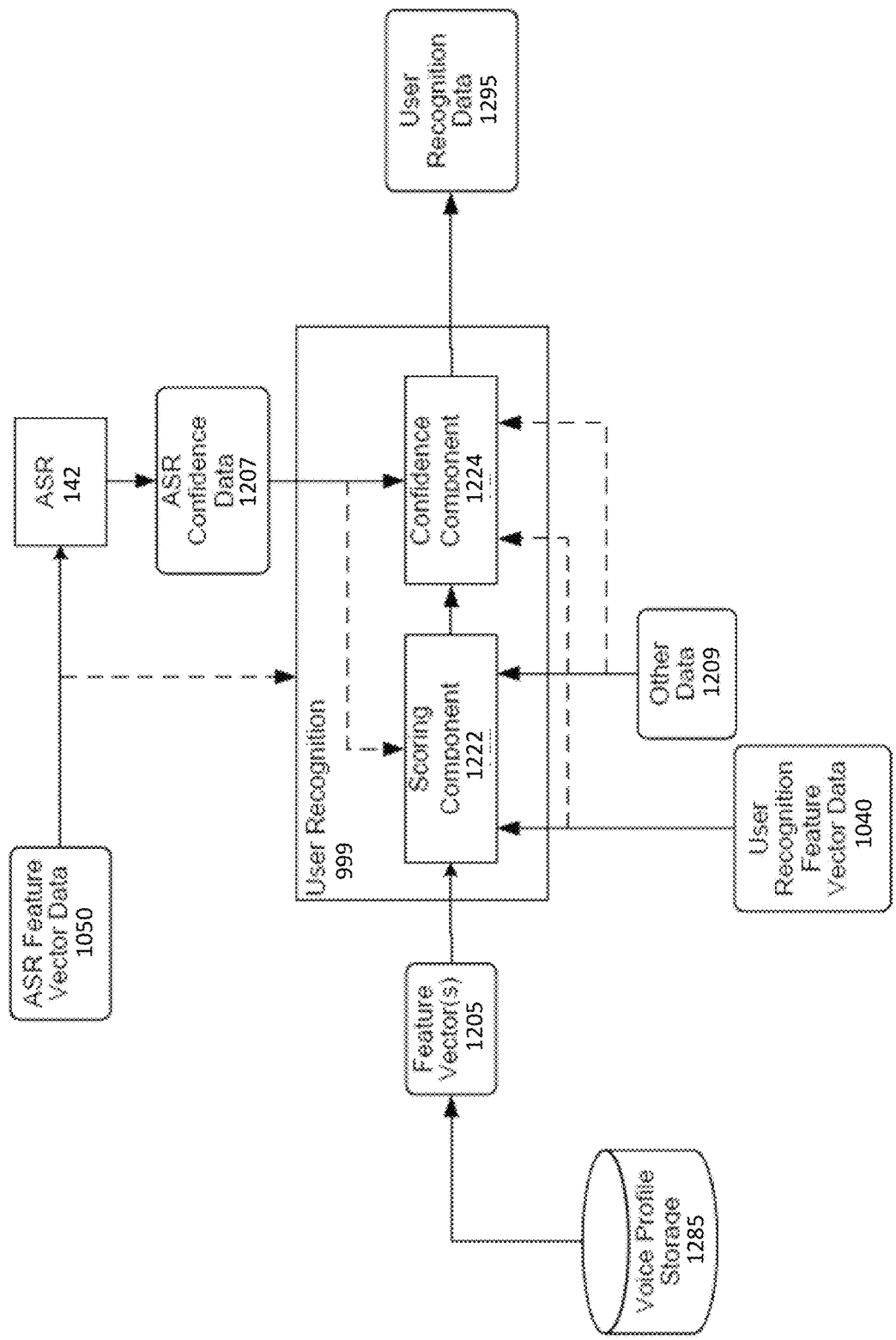
FIG. 12 is a system flow diagram illustrating user recognition according to embodiments of the present disclosure.

FIG. 12 illustrates user recognition processing as may be performed by a user recognition engine 999. The ASR component 142 performs ASR processing on the ASR feature vector data 1050 as described above. ASR confidence data 1207 may be passed to the user recognition engine 999.

The user recognition engine 999 performs user recognition using various data including the user recognition feature vector data 1040, feature vectors 1205 representing explicit and/or anonymous voice profiles, the ASR confidence data 1207, and other data 1209. The user recognition engine 999 may output the user recognition data 1295, which reflects a certain confidence that the user input was spoken by one or more particular users. The user recognition data 1295 may include one or more user identifiers (e.g., corresponding to one or more explicit voice profiles and/or one or more anonymous voice profiles). Each user identifier in the user recognition data 1295 may be associated with a respective confidence value, representing a likelihood that the user input corresponds to the user identifier. A confidence value may be a numeric or binned value.

The feature vector(s) 1205 input to the user recognition engine 999 may correspond to one or more anonymous voice profiles and/or one or more explicit voice profiles. The user recognition engine 999 may use the feature vector(s) 1205 to compare against the user recognition feature vector 1040, representing the present user input, to determine whether the user recognition feature vector 1040 corresponds to one or more of the feature vectors 905 of the anonymous and/or explicit voice profiles.

Each feature vector 1205 may be the same size as the user recognition feature vector 1040. For example, if the user recognition feature vector 1004 is of size F (for example encoded by the encoder 1150), a feature vector 1205 may also be of size F.

To perform user recognition, the user recognition engine 999 may determine the device 102 from which the audio data 1011 originated. For example, the audio data 1011 may be associated with metadata including a device identifier representing the device 102. Either the device 102 or the system(s) may generate the metadata. The system(s) may determine a group profile identifier associated with the device identifier, may determine user identifiers associated with the group profile identifier, and may include the group profile identifier and/or the user identifiers in the metadata. The system(s) may associate the metadata with the user recognition feature vector 1040 produced from the audio data 1011. The user recognition engine 999 may send a signal to the voice profile storage 1285, with the signal requesting only audio data and/or feature vectors 1205 (depending on whether audio data and/or corresponding feature vectors are stored) associated with the device identifier, the group profile identifier, and/or the user identifiers represented in the metadata. This limits the universe of possible feature vectors 1205 the user recognition engine 999 considers at runtime and thus decreases the amount of time to perform user recognition processing by decreasing the amount of feature vectors 1205 needed to be processed. Alternatively, the user recognition engine 999 may access all (or some other subset of) the audio data and/or feature vectors 1205 available to the user recognition engine 999. However, accessing all audio data and/or feature vectors 1205 will likely increase the amount of time needed to perform user recognition processing based on the magnitude of audio data and/or feature vectors 1205 to be processed.

If the user recognition engine 999 receives audio data from the voice profile storage 1285, the user recognition engine 999 may generate one or more feature vectors 1205 corresponding to the received audio data.

The user recognition engine 999 may attempt to identify the user that spoke the speech represented in the audio data 1011 by comparing the user recognition feature vector 1040 to the feature vector(s) 1205. The user recognition engine 999 may include a scoring component 1222 that determines respective scores indicating whether the user input (represented by the user recognition feature vector 1040) was spoken by one or more particular users (represented by the feature vector(s) 1205). The user recognition engine 999 may also include a confidence component 1224 that determines an overall accuracy of user recognition processing (such as those of the scoring component 1222) and/or an individual confidence value with respect to each user potentially identified by the scoring component 1222. The output from the scoring component 1222 may include a different confidence value for each received feature vector 1205. For example, the output may include a first confidence value for a first feature vector 1205*a* (representing a first anonymous or explicit voice profile), a second confidence value for a second feature vector 1205*b* (representing a second anonymous or explicit voice profile), etc. Although illustrated as two separate components, the scoring component 1222 and the confidence component 1224 may be combined into a single component or may be separated into more than two components.

The scoring component 1222 and the confidence component 1224 may implement one or more trained machine learning models (such neural networks, classifiers, etc.) as known in the art. For example, the scoring component 1222 may use probabilistic linear discriminant analysis (PLDA) techniques. PLDA scoring determines how likely it is that the user recognition feature vector 740 corresponds to a particular feature vector 1205. The PLDA scoring may generate a confidence value for each feature vector 1205 considered and may output a list of confidence values associated with respective user identifiers, anonymous voice profile identifiers, and/or explicit voice profile identifiers. The scoring component 1222 may also use other techniques, such as GMMs, generative Bayesian models, or the like, to determine confidence values.

The confidence component 1224 may input various data including information about the ASR confidence 1207, speech length (e.g., number of frames or other measured length of the user input), audio condition/quality data (such as signal-to-interference data or other metric data), fingerprint data, image data, or other factors to consider how confident the user recognition engine 999 is with regard to the confidence values linking users to the user input. The confidence component 1224 may also consider the confidence values and associated identifiers output by the scoring component 1222. For example, the confidence component 1224 may determine that a lower ASR confidence 1207, or poor audio quality, or other factors, may result in a lower confidence of the user recognition engine 999. Whereas a higher ASR confidence 1207, or better audio quality, or other factors, may result in a higher confidence of the user recognition engine 999. Precise determination of the confidence may depend on configuration and training of the confidence component 1224 and the model(s) implemented thereby. The confidence component 1224 may operate using a number of different machine learning models/techniques such as GMM, neural networks, etc. For example, the confidence component 1224 may be a classifier configured to map a score output by the scoring component 1222 to a confidence value.

The user recognition engine 999 may output user recognition data 1295 specific to a single user identifier, anonymous voice profile identifier, or explicit voice profile identifier (or one or more user identifiers, one or more anonymous voice profile identifiers, and/or one or more explicit voice profile identifiers in the form of an N-best list). For example, the user recognition engine 999 may output user recognition data 1295 with respect to each received feature vector 1205. The user recognition data 1295 may include numeric confidence values (e.g., 0.0-1.0, 0-1000, or whatever scale the system is configured to operate). Thus the user recognition data 1295 may output an N-best list of potential users with numeric confidence values (e.g., user identifier 123—0.2, anonymous voice profile identifier 234—0.8). Alternatively or in addition, the user recognition data 1295 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition engine 999 may output an N-best list of potential users with binned confidence value (e.g., user identifier 123—low; anonymous voice profile identifier 234—high). Combined binned and numeric confidence value outputs are also possible. Rather than a list of identifiers and their respective confidence values, the user recognition data 1295 may only include information related to the top scoring identifier as determined by the user recognition engine 999. The user recognition engine 999 may also output an overall confidence value that the individual confidence values are correct, where the overall confidence value indicates how confident the user recognition engine 999 is in the output results. The overall confidence value may be determined by the confidence component 1224.

The confidence component 1224 may determine differences between individual confidence values when determining the user recognition data 1295. For example, if a difference between a first confidence value and a second confidence value is large, and the first confidence value is above a threshold confidence value, then the user recognition engine 999 395 is able to recognize a first user (associated with the feature vector 1205 associated with the first confidence value) as the user that spoke the user input with a much higher confidence than if the difference between the confidence values were smaller.

The user recognition engine 999 may perform thresholding to avoid incorrect user recognition data 1295 being output. For example, the user recognition engine 999 may compare a confidence value output by the confidence component 1224 to a threshold confidence value. If the confidence value does not satisfy (e.g., does not meet or exceed) the threshold confidence value, the user recognition engine 999 may not output user recognition data 1295, or may only include in that data 1295 an indicator that a user speaking the user input could not be recognized. Further, the user recognition engine 999 may not output user recognition data 1295 until enough user recognition feature vector data 1240 is accumulated and processed to verify a user above a threshold confidence value. Thus the user recognition engine 999 may wait until a sufficient threshold quantity of audio data of the user input has been processed before outputting user recognition data 1295. The quantity of received audio data may also be considered by the confidence component 1224.

The user recognition engine 999 may be defaulted to output binned (e.g., low, medium, high) user recognition confidence values. However, such may be problematic in certain situations. For example, if the user recognition engine 999 computes a single binned confidence value for multiple feature vectors 1205, the system may not be able to effectively determine which user originated the user input. In this situation, the user recognition engine 999 may be configured to override its default setting and output numeric confidence values. This enables the system to determine a user, associated with the highest numeric confidence value, originated the user input.

The user recognition engine 999 may use other data 1209 to inform user recognition processing. A trained model(s) or other component of the user recognition engine 999 may be trained to take other data 1209 as an input feature when performing user recognition processing. Other data 1209 may include a variety of data types depending on system configuration and may be made available from other sensors, devices, or storage. The other data 1209 may include a time of day at which the audio data 1011 was generated by the device 102 or received from the device 102, a day of a week in which the audio data audio data 1011 was generated by the device 102 or received from the device 102, etc.

The other data 1209 may include image data or video data. For example, facial recognition may be performed on image data or video data received from the device 102 from which the audio data 1011 was received (or another device). Facial recognition may be performed by the user recognition engine 999, or another component of the system(s). The output of facial recognition processing may be used by the user recognition engine 999. That is, facial recognition output data may be used in conjunction with the comparison of the user recognition feature vector 1040 and one or more feature vectors 1205 to perform more accurate user recognition processing.

The other data 1209 may include location data of the device 102. The location data may be specific to a building within which the device 102 is located. For example, if the device 102 is located in user A's bedroom, such location may increase a user recognition confidence value associated with user A and/or decrease a user recognition confidence value associated with user B.

The other data 1209 may include data indicating a type of the device 102. Different types of devices may include, for example, a smart watch, a smart phone, a tablet computer, and a vehicle. The type of the device 102 may be indicated in a profile associated with the device 102. For example, if the device 102 from which the audio data 1011 was received is a smart watch or vehicle belonging to a user A, the fact that the device 102 belongs to user A may increase a user recognition confidence value associated with user A and/or decrease a user recognition confidence value associated with user B.

The other data 1209 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the audio data 1011 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 102. The global coordinates and associated locations may also or alternatively be associated with one or more user profiles.

The other data 1209 may include data representing activity of a particular user that may be useful in performing user recognition processing. For example, if a user has recently entered a code to disable a home security alarm, and the audio data 1011 was received from a device 102 represented in a group profile associated with the home, signals from the home security alarm about the disabling user, time of disabling, etc. may be reflected in the other data 1209 and considered by the user recognition engine 999. If a mobile device (such as a smart phone, Tile, dongle, or other device) known to be associated with a particular user is detected proximate to (for example physically close to, connected to the same WiFi network as, or otherwise nearby) the device 102, this may be reflected in the other data 1209 and considered by the user recognition engine 999.

Depending on system configuration, the other data 1209 may be configured to be included in the user recognition feature vector data 1040 (for example using the encoder 1150) so that all the data relating to the user input to be processed by the scoring component 1222 may be included in a single feature vector. Alternatively, the other data 1209 may be reflected in one or more different data structures to be processed by the scoring component 1222.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The foregoing illustrates processes that may be performed at runtime to recognize a user that spoke a user input. As indicated previously, the system(s) may be configured to update voice profiles during offline operations. Such voice profile updating may use audio data representing previous spoken user inputs, which were not requested by the system(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising:
receiving a request to authenticate a user profile based at least in part on first data received at a first device, the first data having a first data type;
determining a second device associated with the first device;
receiving second data from the second device, the second data:
including sensor data generated by one or more sensors in an environment of the second device, the one or more sensors configured to detect environmental changes within the environment;
indicating an event determined by the second device, the event being an environmental change predefined as being associated with profile authentication; and
having a second data type that differs from the first data type;
receiving third data from a third device, the third data indicating detection of the event at the third device;
determining a device type of the third device;
requesting authentication of the user profile at the third device based at least in part on the device type of the third device that detected the event;
associating the event with the user profile; and
determining to authenticate the user profile based at least in part on the sensor data and receiving an indication of the authentication from the third device.

2. The method of claim 1, wherein:
the event further includes a predefined device communicating with the second device over a short range communication protocol; and the second data further indicates devices communicating with the second device over the short range communication protocol.

3. The method of claim 1, further comprising:
receiving audio data representing a user utterance while the user profile is authenticated;
determining an action to be performed in response to the user utterance utilizing data from the user profile based at least in part on the user profile being authenticated; and
causing the action to be performed while the user profile is authenticated.

4. The method of claim 1, wherein:
the event further includes a predefined device mode of the second device; and
the second data further indicates that a device mode transition has occurred with respect to the second device.

5. The method of claim 1, wherein:
the event further includes a predefined device state of the third device associated with the second device; and
the second data further indicates that a device state transition of the third device has been detected by the second device.

6. The method of claim 1, further comprising:
receiving request data for utilizing an application;
determining that the request data is received from a device on which the user profile is authenticated based at least in part on determining to authenticate the user profile; and
enabling use of the application on the device.

7. The method of claim 1, wherein:
the first data corresponds to speaker identification processing results indicating detection of speech from a user associated with the user profile;
the second data corresponds to audio data representing user speech; and
the event further includes a predefined wake word being detected in the user speech.

8. The method of claim 1, wherein
determining to authenticate the user profile is based at least in part on the third device having the device type.

9. The method of claim 1, wherein the environmental change includes detecting presence of a signal from an authentication device within the environment.

10. The method of claim 1, wherein the sensor data includes audio data associated with an authentication device within the environment.

11. A system, comprising:
one or more processors; and
non-transitory computer-readable media storing instructions that, when executed by the one or more processors, cause the one or more processors to perform operations comprising:
 receiving a request to authenticate a user profile based at least in part on first data received at a first device, the first data having a first data type;
 determining a second device associated with the first device;
 receiving second data from the second device, the second data:
  including sensor data generated by one or more sensors in an environment of the second device, the one or more sensors configured to detect environmental changes within the environment;
  indicating an event determined by the second device, the event being an environmental change predefined as being associated with profile authentication; and
  having a second data type and differs from the first data type;
 receiving third data from a third device, the third data indicating detection of the event at the third device;
 determining a device type of the third device;
 requesting authentication of the user profile at the third device based at least in part on the device type of the third device that detected the event;
 associating the event with the user profile; and
 determining to authenticate the user profile based at least in part on the sensor data and receiving an indication of the authentication from the third device.

12. The system of claim 11, wherein:
the event further includes a predefined device communicating with the second device over a short range communication protocol; and
the second data further indicates devices communicating with the second device over the short range communication protocol.

13. The system of claim 11, the operations further comprising:
receiving audio data representing a user utterance while the user profile is authenticated;
determining an action to be performed responsive to the user utterance utilizing data from the user profile based at least in part on the user profile being authenticated; and
causing the action to be performed while the user profile is authenticated.

14. The system of claim 11, wherein:
the event further includes a predefined device mode of the second device; and
the second data further indicates that a device mode transition has occurred with respect to the second device.

15. The system of claim 11, wherein:
the event further includes a predefined device mode of the third device associated with the second device; and
the second data further indicates that a device mode transition of the third device has been detected by the second device.

16. The system of claim 11, the operations further comprising:
receiving request data for utilizing an application;
determining that the request data is received from a device on which the user profile is authenticated based at least in part on determining to authenticate the user profile; and
enabling use of the application on the device.

17. The system of claim 11, wherein:
the first data corresponds to speaker identification processing results indicating detection of speech from a user associated with the user profile;
the second data corresponds to audio data representing user speech; and
the event further includes a predefined wake word being detected in the user speech.

18. The system of claim 11,
wherein determining to authenticate the user profile is based at least in part on the third device having the device type.

19. The system of claim 11, wherein the environmental change includes detecting presence of a signal from an authentication device within the environment.

20. The system of claim 11, wherein the sensor data includes audio data associated with an authentication device within the environment.

* * * * *